United States Patent [19]

Yu

[11] 3,715,727

[45] Feb. 6, 1973

[54] CONTROL MECHANISM AND BUS FOR A DATA PROCESSING POOLER SYSTEM

[75] Inventor: Frank K. Yu, Burlington, Mass.

[73] Assignee: Honeywell, Inc., Minneapolis, Minn.

[22] Filed: June 11, 1970

[21] Appl. No.: 45,523

[52] U.S. Cl. .......... 340/172.5

[51] Int. Cl. .......... G06f 3/00

[58] Field of Search .......... 340/172.5

[56] References Cited

UNITED STATES PATENTS

| | | | |
|---|---|---|---|
| 3,480,914 | 11/1969 | Schlaeppi | 340/172.5 |
| 3,274,554 | 9/1966 | Hopper et al. | 340/172.5 |
| 3,372,378 | 3/1968 | Devore et al. | 340/172.5 |
| 3,400,373 | 9/1968 | Nicholson | 340/172.5 |
| 3,416,139 | 12/1968 | Marx | 340/172.5 |
| 3,445,822 | 5/1969 | Driscoll | 340/172.5 |
| 3,470,542 | 9/1969 | Trantanella | 340/172.5 X |
| 3,482,215 | 12/1969 | Murayama | 340/172.5 |
| 3,530,440 | 9/1970 | Osborne | 340/172.5 |
| 3,593,302 | 1/1971 | Saito et al. | 340/172.5 |
| 3,623,001 | 11/1971 | Kleist et al. | 340/172.5 |
| 3,623,002 | 11/1971 | Mayne et al. | 340/172.5 |
| 3,623,011 | 11/1971 | Baynard, Jr. et al. | 340/172.5 |

*Primary Examiner*—Paul J. Henon
*Assistant Examiner*—Melvin B. Chapieck
*Attorney*—Fred Jacob and Leo Stanger

[57] ABSTRACT

An improved data processing pooler system for pooling data cooperatively to a central computer compatible magnetic tape or tapes from other computer compatible magnetic tape or tapes, utilizing key-to-tape units, each key-to-tape unit having device-control-area (DCA) units as an interface between said key-to-tape units, said DCA's being coupled to each other by a pooler bus of the "hand shake" type having a plurality of bidirectional lines for transmitting or receiving control and/or data signals. The system comprises input/output devices of the key-to-tape type, one device having a master pooler adapter and controls capable of operating as the master or control pooler unit, whereas the other devices have a slave pooler and controls capable of operating as slave or controlled pooler unit(s). An input/output (I/O) bus connects a central processor (CCU or CPU) unit in each key-to-tape unit with the device-control-area (DCA) also in each key-to-tape unit; said I/O bus contains a group of bi-directional multifunction lines, single function lines and a second group of control lines which form an array. Sending key-to-tape units and receiving key-to-tape units, each individually having its own memory, are connected by a pooler bus, and interfaced via the key-to-tape device-control areas (DCA's) which contain the necessary logic to link the sending and receiving pooler adapters together, and to provide the control of information flow to and/or from the respective sending and receiving memories. Additional logic circuitry write and/or read information into or out of said memories and onto or out of the magnetic tapes.

25 Claims, 35 Drawing Figures

INVENTOR
FRANK K. YU
BY Nicholas Prasinos
ATTORNEY

INVENTOR
FRANK K. YU
BY Nicholas Prasinos
ATTORNEY

INVENTOR
FRANK K. YU
BY Nicholas Prasinos
ATTORNEY

INVENTORS

BY

ATTORNEYS

PATENTED FEB 6 1973 3,715,727

SHEET 08 OF 20

I/O BUS

| | FUNCTION LINE | STROBE LINES BIS | ADS | OPG OPS-OCS | OCG OPS-OCS | IPG IPS-ICS | ICG IPS-ICS | OCD OPS-OCS | ICD IPS-ICS |
|---|---|---|---|---|---|---|---|---|---|
| MULTI-FUNCTION LINES | F01 | DATA | AD1 | PB1 | TMD | PRQ | ERR | | TBS |
| | F02 | DATA | AD2 | PB2 | TRB | IDP | MIN | | TEF |
| | F03 | DATA | AD3 | PB3 | EOD | ALP | MDC | | |
| | F04 | DATA | AD4 | PB4 | TAK | BUR | DUP | | |
| | F05 | DATA | | PB5 | | VER | SKP | | |
| | F06 | DATA | | PRM | | AGN | LZK | | |
| | F07 | DATA | | TER1 | | ISP | TMW | | |
| | F08 | DATA | | TER2 | | ILZ | REW | | |
| | F09 | DATA | TMF | ERO | | | RLK | | |
| SINGLE FUNCTION LINES | ADV | ADDRESS VALID (DCA → CCU) | | | | | | | |
| | INT | INITIALIZE (CCU → DCA) | | | | | | | |
| | PDA | COMMON TIMING (CCU → DCA) | | | | | | | |
| | D1T | DEVICE TRANSMIT (DCA → CCU) | | | | | | | |
| | D1R | DEVICE RECEIVE (DCA → CCU) | | | | | | | |
| | DIN | DEVICE INITIALIZE (DCA → CCU) | | | | | | | |
| | TSM | TRAFFIC STATE MODIFY (DCA → CCU) | | | | | | | |
| | HSC | HIGH SPEED COMMUNICATOR (DCA → CCU) | | | | | | | |
| | WMD | CCU IN WRITE MODE (CCU → DCA) | | | | | | | |
| | VMD | CCU IN VERIFY (CCU → DCA) | | | | | | | |

Fig. 8.

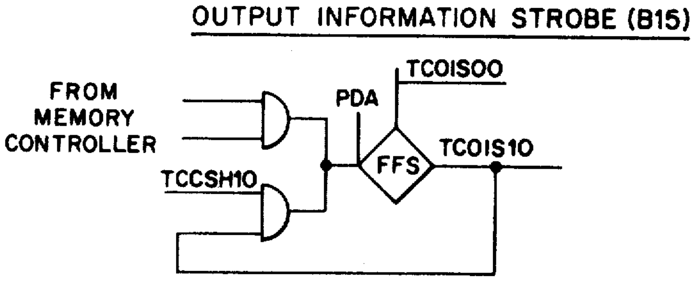
Fig. 11B.
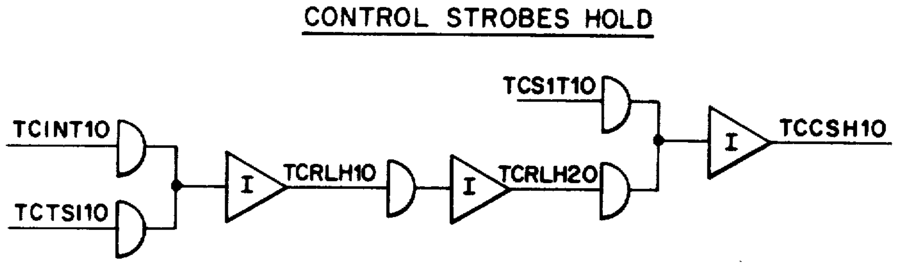
Fig. 11C.
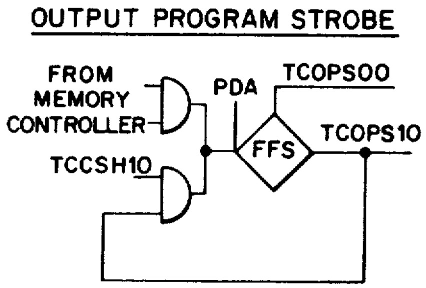
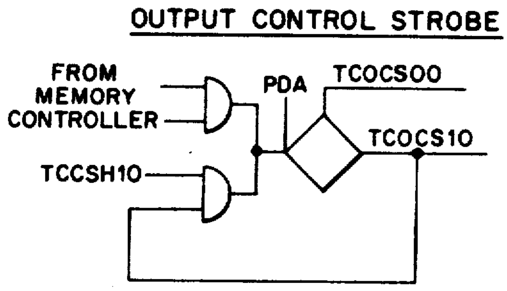
Fig. 11D. Fig. 11E.

UNIT DEFINED

CSH GEN.

CONTROL MECHANISM AND BUS FOR A DATA PROCESSING POOLER SYSTEM

BACKGROUND OF THE INVENTION

1. Field of the Invention

This invention relates generally to automatic data processing systems of the keyboard-to-magnetic tape type used in the preparation of data from source documents to computer compatible magnetic tape.

More particularly, the invention relates to a data pooling system from one or more computer compatible magnetic tapes to another computer compatible magnetic tape.

2. Description of the Prior Art

In automatic data processing operations pooling systems are known wherein one or more small remote satellite computer locations are interconnected with a large central data processing center by a transmission medium. Typically such equipment must accept data from a magnetic tape at one location in parallel bit form, convert the data from parallel to serial form, ready it for transmission over the communication medium to the remote location, where the data is extracted, further processed or pooled, in unchanged or edited form on to other magnetic tapes. In addition to preparing and converting data to be transmitted, control information and status information must be conveyed between the computers and tapes and vice versa. In some prior art systems data control signals are transmitted over the transmission medium, which requires additional equipment, broader band width of the communication medium, and poses problems of synchronization. In other prior art systems the control signals are inserted in the transmitting signal stream and transmitted over the same medium as the data by interlacing control characters during the intervals when no data characters are available for processing and transmission.

Whereas systems of this type may perform a variety of pooling functions from local or remote peripheral devices they have the disadvantage of imposing on the central processor by interrupting and taking away valuable processing time thus reducing the overall processing efficiency of the system.

Still other prior art pooling systems perform their pooling operations by communicating directly from one tape transport to another. However, these systems do not have the ability to transmit data and control signals, nor do they have the capability of additional data transmission between the master unit thereof and additional peripheral slave units via input/output and pooler buses external to the central processor compatible with a variety of attachments. Whereas, it is known in the art of electronic data processing to transmit data via a bus as a transmitting medium to various peripheral equipment external to the central processor, these buses are either of the "daisy-chain" bus or "-time" bus types. In prior art "daisy-chain" buses, a plurality of uni-directional lines transmit data signals between the central processor and peripheral control units (PCU'S), thus requiring separate data lines for transmitting data for each direction of transmission. In the "time" buses, the PCU'S operate synchronously in conjunction with timing signals from the central processor, and data received from the bus, to operate their internal logic and accept the information on the bus and generate acknowledgment signals and other responses. This requires more complex timing, receiving, and transmitting apparatus than if the buses operate asynchronously.

SUMMARY OF THE INVENTION

The invention herein disclosed comprises an expandable pooler system and apparatus capable of operating between key-to-tape peripheral electronic data processing units for allowing the transfer of information between the key-to-tape devices in the pooling system. During the pooling operation, data fields may be added and/or deleted; duplicate fields may be added, and/or data may be shifted but not transposed within a record. The system is comprised of a plurality of key-to-tape devices. Each key-to-tape device comprises a central control unit (CCU), sometimes referred to as a central processing unit (CPU), a main control station unit (MCS), an auxiliary control station unit (ACS), and a device control area unit (DCA). An input/output (I/O) bus couples the CCU to its DCA for transfer of information from the CCU to the DCA in a given key-to-tape unit. For transfer of information from one key-to-tape unit to another, the system may be arranged by proper selection of manual switches, as a master-slave system, i.e., one or more key-to-tape units may transmit information to one or more other key-to-tape units, such transmission of information being performed cooperatively and asynchronously in "hand shake" manner, the slave unit obeying orders from the master of its performance or non-performance or its ability to perform or not, from transmitting device to receiving device. The transmission of information from one key-to-tape device to another is accomplished via a pooler bus also known as a peripheral bus which couples the master DCA and the slave or slaves DCA's, via a plurality of bidirectional lines. The transmission of information is from one memory of a CCU to another memory of another CCU. The control of the flow of information is via that part of the CCU of each key-to-tape device having a traffic controller, the I/O interface area and the I/O bus.

The traffic controller of each key-to-tape device has four traffic states. When a selected key-to-tape device is the read (transmit) device, data is read from its tape into its buffer memory during traffic state 1 (TS1) and is transmitted over the pooler bus during traffic state 4 (TS4). When a selected key-to-tape device is the write (receive) device, data from the pooler device is entered into its buffer memory during traffic state 2 (TS2) and is transferred from its memory onto its tape during TS4. Logic circuitry associated with the traffic controller generates signals which permit asynchronous operation of the system.

OBJECTS

It is an object, therefore, of the instant invention to provide an improved low cost electronic data processing system for pooling data onto computer compatible magnetic tape.

It is a further object of the instant invention to provide an improved input/output and pooler bus system for transmission and receipt of data and control signals between peripheral devices.

It is still a further object of the instant invention to provide an improved traffic controller unit for transmitting data and/or commands across an input/output and pooler bus system.

Other objects and advantages of the invention will become apparent from the following description of a preferred embodiment of the invention when read in conjunction with the drawings contained herewith.

BRIEF DESCRIPTION OF THE DRAWINGS

FIG. 8 is a table showing the I/O bus control and multi function lines and the single function lines, the control and multifunction lines forming an array.

FIGS. 11*a* through 11*e* are a logic block diagrams of the central control unit timing and strobe generation.

DESCRIPTION OF THE PREFERRED EMBODIMENT

General

Figure 1:
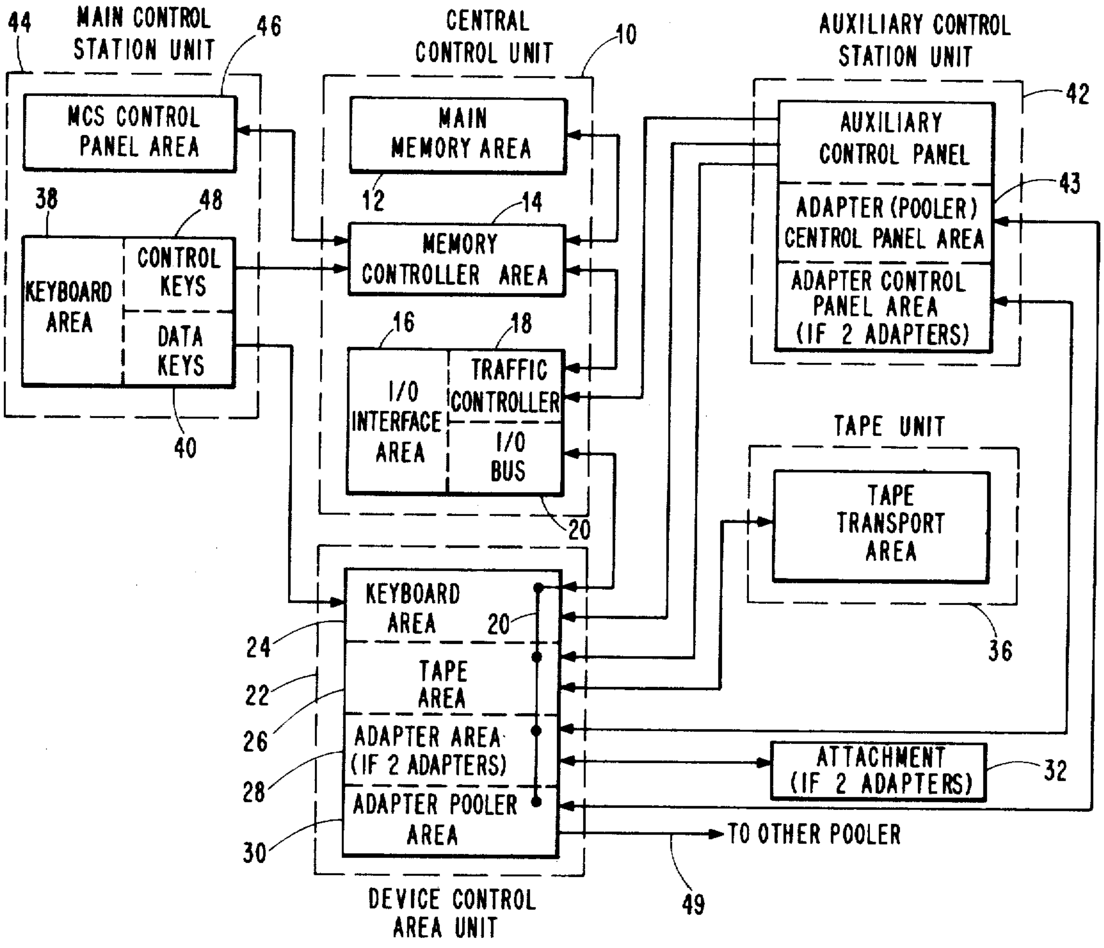
FIG. 1 is a block diagram of a portion of the overall expanded pooling system of the invention.

In a basic key-to-tape device, operation may be accomplished in any one of a plurality of modes. Commonly available modes of operation are PROGRAM-ENTRY, PROGRAM-VERIFY, DATA-ENTRY, DATA-VERIFY AND SEARCH. In such devices, a buffer memory, which may be a core memory of fixed length is used to buffer data between the keyboard and the file memory or magnetic tape storage medium. Program and/or data information must pass through the buffer memory during each of the operations named above. Such a core memory may have, for example, 21 bits per column and 90 columns. A typical record length is 80 characters, the remaining 10 columns of core being used for longitudinal parity and cyclical redundancy checking. In each column comprising 21 cores or bits, 5 bits may be used for a first program, 5 bits for a second program, 8 bits for data, 1 bit for data parity, 1 bit for duplication (duplify bit), and 1 bit for program parity. Obviously, these figures are only exemplary and the memory may be of any convenient size or configuration. For example, a seven-track system may have only 6 data bits per character instead of the 8 normally used in nine-track systems.

The machine may operate under no program control or under the control of either a first or second program, the state of program control being operator selectable by means of a switch on the keyboard control panel.

A key-to-tape pooler system consists of a plurality of such basic key-to-tape devices, one being designated the master pooler or POOLER1 and the other devices being designated as slaves or POOLERS 2 and 3, etc.. The difference between the master pooler or pooler 1 and the slave poolers or poolers 2 and 3, etc., is that the control panel for the master pooler contains the switches to select the read-write poolers, the switches to select different stop codes and the switches to select the mode of operation, while the control panel for the slave poolers only contain status indicators.

Pooler 1's control panel for the master pooler contains a four-position rotary read switch used to select the desired read (transmit) device in a pooling operation. Pooler 1 control panel also has a four-position rotary write switch used to select the desired write (receive) device in a pooling operation.

As indicated previously, each basic key-to-tape device may operate in any one of five selectable modes, the modes being selectable by the operator through a five position switch on the keyboard control area. In pooler operations the data entry mode must be selected on the device assigned as the write device, and the data verify mode must be selected on the device assigned as the read device. Furthermore, the four position read switch on pooler 1 control panel must be set at the number 1 position when pooler 1 is to be used as the read device, in the 2 position when pooler 2 is to be used as a read device and in the 3 position when pooler 3 is to be used as a read device. Similarly, the 4 position write switch on pooler 1 must be set in position 1, 2, or 3 depending on what pooler units are to be assigned as write devices. If a pooler is selected as the read device; it should not be selected as the write device at the same time. Interlock logic (not shown) has been provided to prevent a pooler from being selected as both read and write device at the same time.

When the pooler system is thus set up the information flow from a read device to a write device is generally as follows: a character is read out of the main memory of the read device CCU and placed on the read I/O bus via the I/O bus interface, whereupon an information strobe (ISB) later to be described in more detail, gates the character from the I/O bus into the read DCA. The character is then placed on the pooler bus, and input information strobe (IIS) gates the character into the write DCA, whereupon it is gated on the write I/O bus coupling the write CCU with the write DCA and subsequently transferred to the write device CCU via the write I/O bus interface. The character is written into the main memory of the write device CCU and when the memory is filled, the record is written onto the tape. This sequence continues until the tape mark, a stop code, or 18 inches of blank tape is detected by the read pooler DCA.

The system may also operate under program control when an operator selectable switch is placed on either program 1 or 2, and an Auto-Dup or Auto-Skip switch is on. With the pooling system under program control, certain columns from one tape may be automatically duplicated on another tape; or columns from one tape may be skipped before additional data is received from the read device; thus data may be shifted within a record.

OVERALL DESCRIPTION OF THE EXPANDED POOLER SYSTEM

FIG. 1 is a block diagram of one key-to-tape system utilized in the overall expanded pooler system. This key-to-tape unit may be utilized as the master or slave unit depending on the control switches available on the adapter pooler control panel as previously described. The key-to-tape unit of FIG. 1 includes a central control unit (CCU) 10 containing a main memory 12, a memory controller 14 and an I/O interface 16 which has a traffic controller 18 and an I/O bus portion 20. The I/O bus is connected to a device control area unit 22, and is "daisy-chained" from a keyboard device control area (DCA) 24 to a tape DCA 26, a first adapter 28, and a pooler adapter area 30. The first adapter 28 provides interface between the I/O bus and peripheral attachment 32. The adapter pooler area 30 provides interface between the I/O bus and other poolers indicated by arrow 49.

The tape DCA 26 is connected to the tape transport unit 36 and the keyboard DCA 24 is connected through the data key portion 40 of the keyboard area 38. All the device control areas are connected to an auxiliary control station (ACS) 42 which provides start and reset controls to be later described.

The key-to-tape system also includes a main control station unit 44 of which the keyboard 38 is a portion and which contains a separate control panel 46. The keyboard area 38 also contains a plurality of control keys 48 which are connected to the memory control area 14.

In general, therefore, the system comprises the following major units: Main Control Station Unit, Central Control Unit, Device Control Unit, Auxiliary Control Station Unit, Tape Unit and Attachments.

The Main Control Station Unit (MCS) consists of the main control station control panel and the keyboard area. The MCS control panel receives system status information from the memory controller in the central control unit. Monitor data may be visually displayed by the MCS control panel indicators. In the keyboard area, when one of the control keys is depressed, a signal is sent to the memory controller. This signal implements the device control operations. An activated data key supplies a signal to the keyboard DCA.

The Central Control Unit has a main memory area, a memory controller area, and I/O interface and a traffic controller. The main memory may include a magnetic core portion as previously described, a memory local register, timing and access counters, parity generation, check circuits and logic circuits. The magnetic core memory stores program and data information as previously described. Input data to the magnetic core memory comes from the memory controller. Memory output is fed to the memory controller for ultimate transfer to the DCA. The memory controller contains automatic operation, major cycle control, and memory parity error logic. The device control signals are received from the keyboard control keys. The memory controller sends information to the foregoing areas, system status to the MCS control, input and output data to main memory and instructions to the traffic controller.

The I/O interface consists of the traffic controller and the I/O bus. The I/O bus is the communication medium connecting the central control unit and the device control areas. The traffic controller contains traffic state generation logic and the CCU – I/O bus interface. DCA addressing signals are correlated by the traffic controller into a correct sequence of memory controller cycles.

The device control unit provides asynchronous interface between the CCU and the areas controlled by the traffic controller. (i.e., keyboard, tape transport and adapters). The DCA keyboard area receives the data key input signals. These signals are transferred through the DCA to the I/O bus. The keyboard DCA obtains control instructions from the auxiliary panel.

The tape section of the DCA contains tape read/write logic and drive, check and motion logic for the tape transport. The Device Control Area 26 is the input/output interface for the tape unit and is sometimes herein referred to as a peripheral control unit (P-CU). The tape DCA also receives control signals from the ACS control panel.

The adapter DCA's interface with adapters connected to the system. The DCA accepts control signals from the adapter control panel.

The auxiliary control station unit consists of the auxiliary control station control panel, the adapter control panel and the pooler adapter control panel area. The ACS control panel provides control signals to the traffic controller, the keyboard DCA or the tape DCA. The tape unit also interfaces directly with the ACS control panel.

The tape unit consists of a tape transport and interfaces with the ACS control panel. The tape unit receives information to be written on tape from the tape section of the DCA. Data read from tape is supplied to the tape DCA and is then transferred to the I/O bus.

Detailed description with block diagrams of the Main Memory Unit, Memory Controller Unit, Traffic Controller Unit and I/O Interface along with details of Traffic State Applications and Traffic State Data Paths are to be found in copending application Ser. No. 24,771 for INPUT/OUTPUT BUS of William F. O'Neill, Farid J. Neema and Edward P. Hopey filed on Apr. 1, 1970 and assigned to the same assignee of the instant application.

POOLING OPERATION SEQUENCE AND INFORMATION FLOW

The pooling operation is the transfer of data from one or more computer compatible magnetic tapes to one or more other computer compatible magnetic tapes and is described by reference to FIG. 2.

Figure 2:
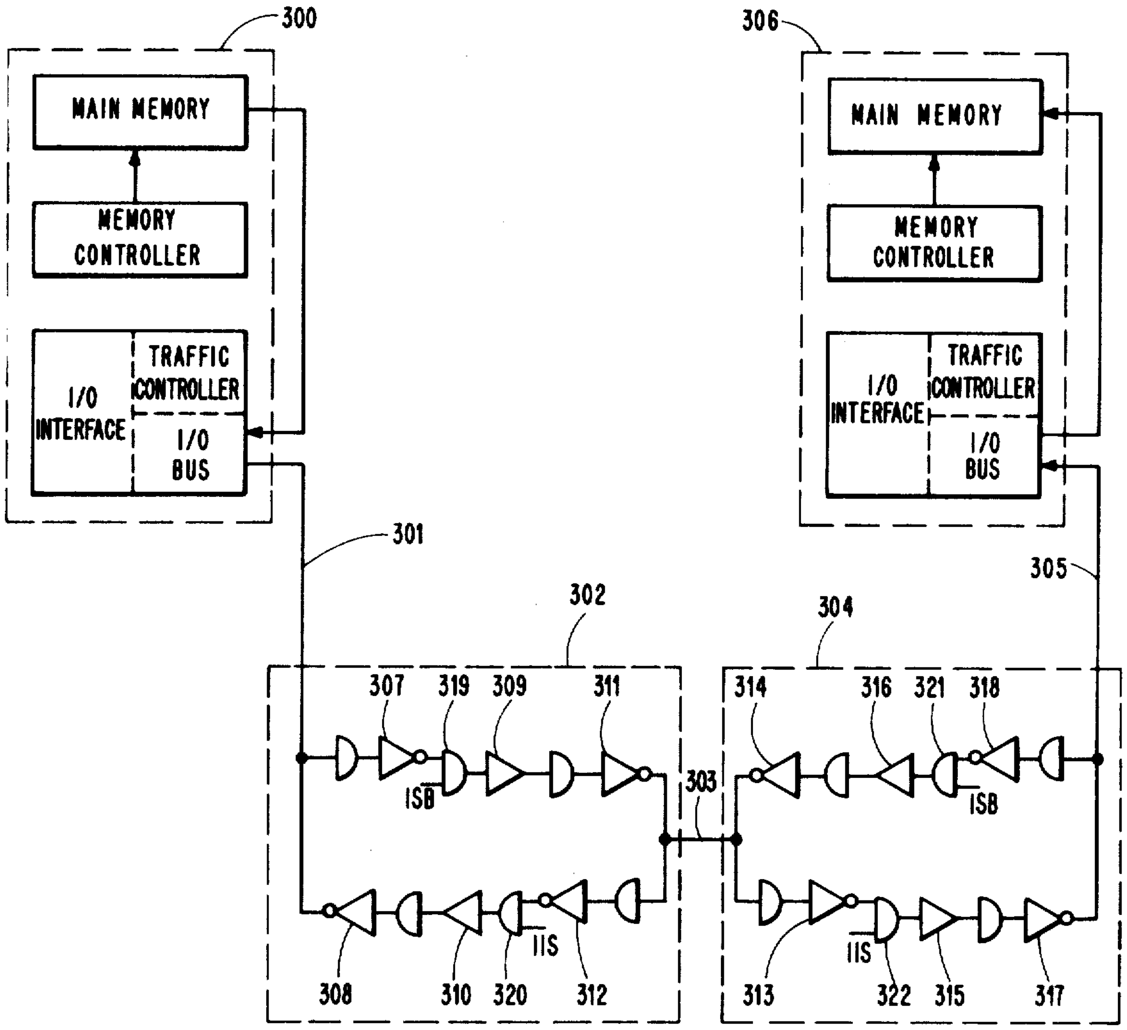
FIG. 2 is a logic block diagram of portions of the overall expanded pooling system of the invention depicting general information flow.

Referring now to FIG. 2 a read-device CCU 300 containing a main memory, memory controller, I/O interface, traffic controller and I/O bus as previously described with FIG. 1 is coupled via I/O bus 301 to read DCA 302. Read-DCA 302 is coupled to write-DCA 304 via pooler-bus 303; and write-DCA 304 is coupled to write-device CCU 306 by an I/O bus 305. To minimize confusion in explaining the pooler information flow, the required logic for bit 1 is shown in read-DCA 302 and write-DCA 304; however, the timing logic is not shown here but is later described in detail. The multifunction line driver/receivers for bit 1, 307 and 308 respectively are connected to the I/O bus 301. The data line driver/receivers 311 and 312, respectively, for bit 1 of read-DCA 302 are coupled by a pooler bus 303 to the line driver/receivers 313 and 314 respectively of bit 1, of write DCA unit 304; and multifunction line driver/receiver of bit 1 of write DCA 304 are coupled to the write device CCU via I/O bus 305. Amplifier 309 and AND gate 319 provide gating means from read-DCA 302 to pooler-bus 303 while amplifier 3015 and AND gate 322 provide gating means for bit 1 from pooler-bus 303 to write DCA 304. Similarly AND gates 320 and 321 and amplifiers 310 and 316 provide gating means for bit 1 in the other direction.

Figure 3:
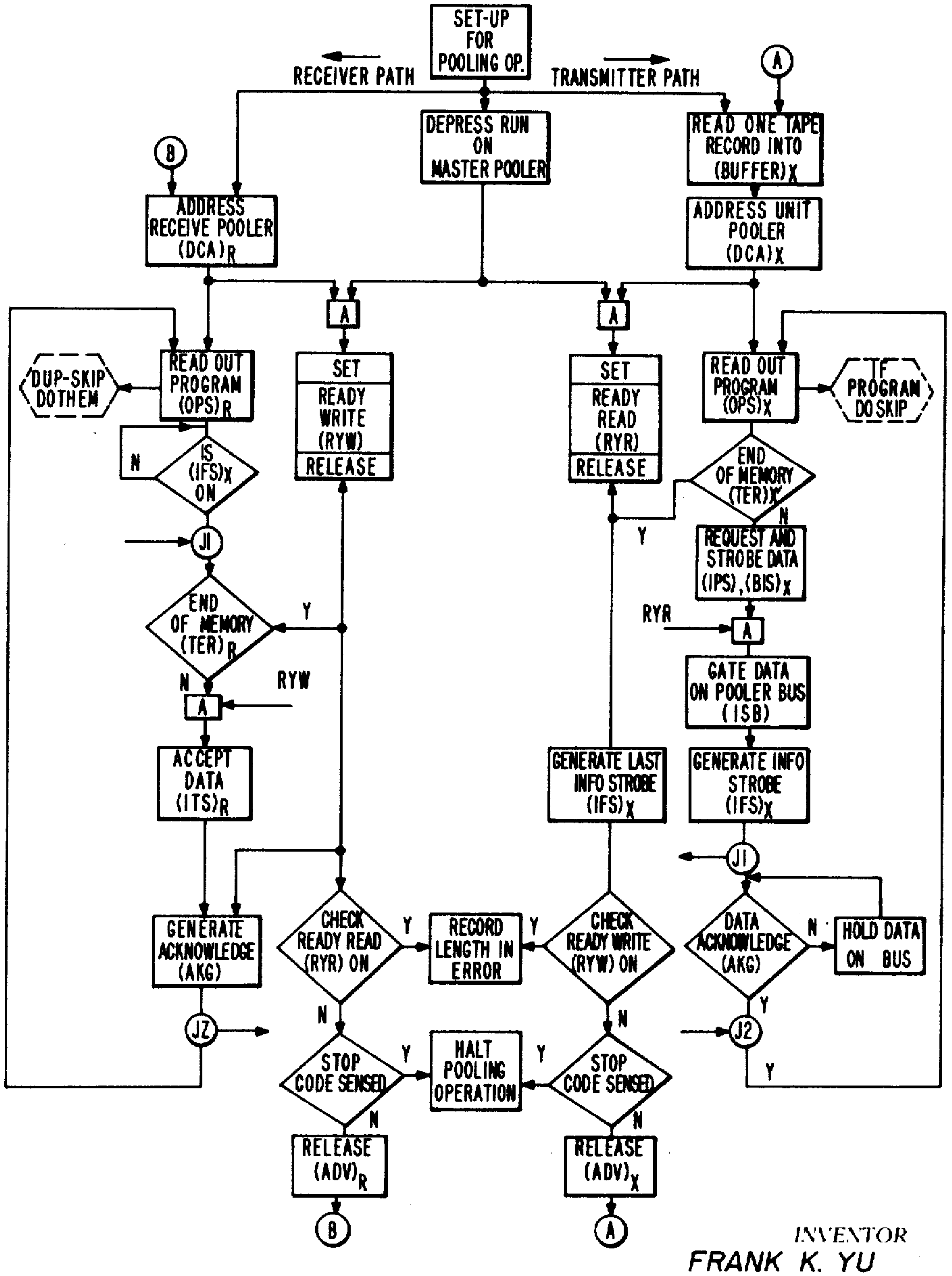
FIG. 3 is a logic flow chart of the pooling operations of the invention.

Assuming that the pooler system is set up by the proper selection of modes of operation and the desired read and write devices (logic to be described in detail hereinafter), the pooling operation sequence will be further described by referring to FIGS. 2 and 3. Depressing the Reset and Start push buttons (not shown) on the read pooler, herein also referred to as the transmitter pooler, causes one record to be read from the tape and written into memory 12 in FIG. 1. When the complete record is written into memory the transmitter DCA 302 is addressed. The transmitter DCA 302 requests the program bits of column 1 to be read out of memory; the program bits are then checked for automatic Skip and also the End of Record (TER) is checked at this time. The DCA 302 now request and receives the column one data information across the I/O bus 301. The transmitter operation halts at this juncture until the run push button located in master pooler adapter control panel 43 on FIG. 1 is depressed.

Depressing the Reset and Start push buttons (not shown) on the write pooler, herein also referred to as the receiver pooler, causes the receiver DCA 304 to be addressed. The receiver DCA requests the program bits of column 1 and checks for automatic Dup or Skip operation. The receive DCA checks the pooler bus 303 for IFS (a signal generated by the transmitter which informs the receiver that there is information on the bus).

Depressing the run button on the master pooler adapter control panel 43 on FIG. 1 enables Ready Read (RYR) — a read ready line of the pooler bus which indicates proper read device set up — and allows column one data information to be placed on the pooler bus 303. The transmitter DCA 302 informs the receiver DCA 304 that the information is on the bus 303 via IFS — a timing signal on a data strobe line on the bus which indicates that data is valid. The transmitter halts with the information on the pooler bus until the receiver accepts the information off the bus and signifies acceptance by sending the transmitter an acknowledged response AKG-via, an acknowledgement line on the pooler bus, said pooler bus to be later described in detail.

Depressing the Run button, previously mentioned, further enables Ready Write (RYW) — a write ready line on the pooler bus indicating proper write set up — because IFS is being sent when the receiver checks for End of Memory (TER). If the end of memory is sensed by the receiver DCA, the Ready Write RW is released. When next information strobe is received from the transmitter, a check is made to insure that the transmitter has already transmitted a complete record. If TER previously described is not set, the receiver accepts the information off the pooler bus 303 and signals the transmitter with AKG that column 1 data has been written into the receiver CCU main memory 306. The transmitter now requests the program bits from column 2 and also the receiver requests the program bits from column 2. The loop is now completed and the information is transferred from the transmitter pooler to the receiver pooler as previously described until the end of memory is detected.

As the column counter of transmitter pooler (not shown) reaches TER, Ready Read (RYR) is reset and a final information strobe is generated, a check is made to insure that all characters have been received by the receiver, and if the correct number of characters has been received, a check for a stop code is made. The detection of a stop code halts the operation; however, if the stop code is not sensed, the Address Valid Line (ADV) — to be hereinafter described — is released. The traffic state is advanced via a traffic state sequencer and the next record is read from tape. (A description and the operation of the traffic state sequencer is given in copending application Ser. No. 24,771 of William F. O'Neill et al for Input/Output Bus assigned to the same assignee as the instant application). Upon completion of the read from the tape the transmitter DCA is addressed and Ready Read (RYR) is set while Run is still high. The second record is now transferred in the same manner as the first record.

The stop code logic is then examined and if a stop code is sensed, the operation halts; if no stop is sensed, the Address Valid ADV line is released and the receiver DCA is again addressed. The second record is then accepted in the same manner as the first record as hereinbefore described.

POOLER SET-UP

In setting up the pooling system the key-to-tape devices are selected by setting the mode switch and the read and write switches to their proper positions as previously described. The logic, the associated switches and the following description of the pooler set-up is with reference to FIGS. 4a through **4*f*. If, for example, the master pooler DCA is selected to be the read, or transmit device, the read switch (FIG. 4*a*) is set to position 1, applying 5 volts DC via SR11Z to SRF10, and the select Read Function SRF — there are two Read Select lines in the pooler bus line as later described — is high in the selected DCA (FIG. 4***c*).

Figure 4A:
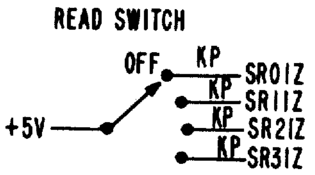
FIGS. 4*a* through 4*e* are logic block diagrams of the read and write select functions.
Figure 4B:
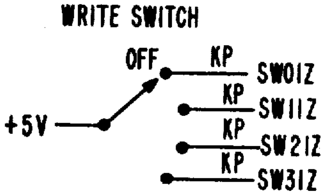
Figure 4C:
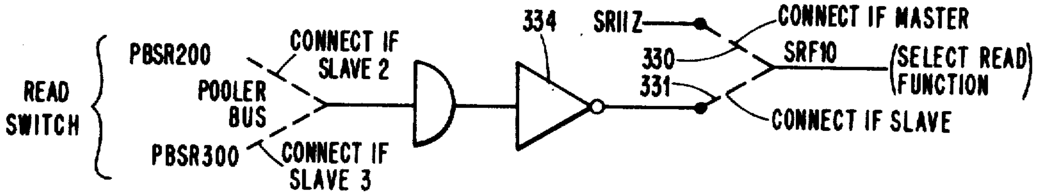

If slave Pooler 2 or slave Pooler 3 is selected to be the read device, the output of the bus receiver amplifier 334 on FIG. 4*c* is forced to high which in turn forces SRF10 high via the jumper connection 331. The input to the pooler bus receiver amplifier, not shown, is connected to PBSR 200 in the DCA designated as Pooler 2 whereas PBSR 300 is connected in the DCA designated as Pooler 3 to its bus receiver amplifier not shown.

Figure 4D:
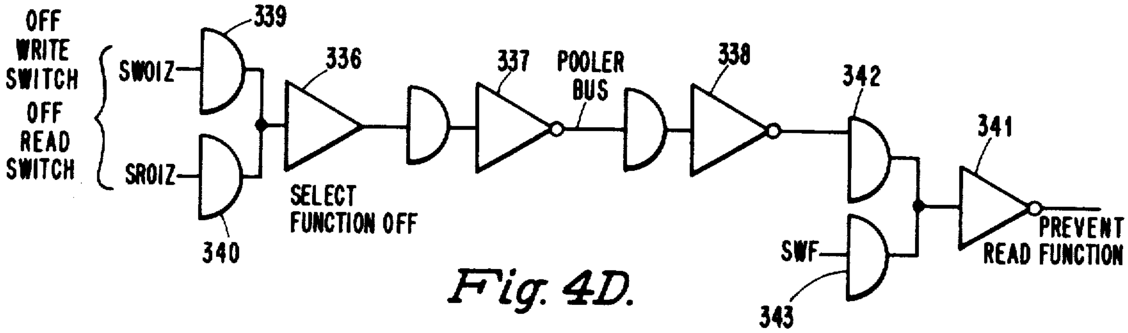
Figure 4E:
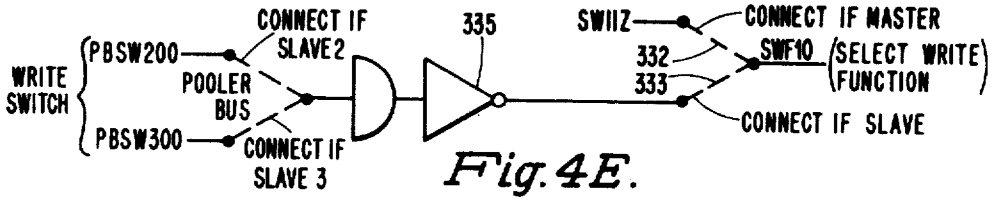
Figure 4F:
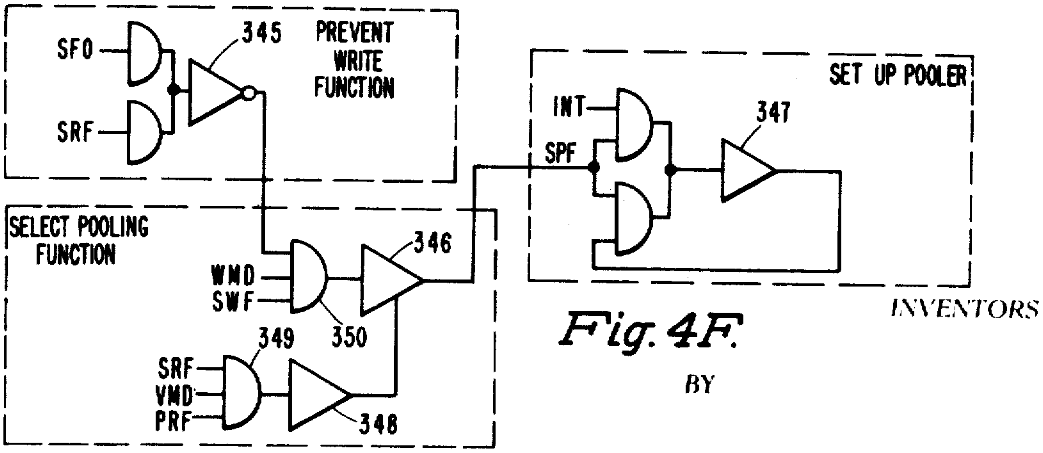
FIG. 4*f* is a logic block diagram of the pooler set up function.

Referring to FIGS. 4*b* and 4*e*, if the master pooler DCA is selected as the write device the write switch is set to position 1, which applies 5 volts DC to SWF10 via jumper connection 332 between SW11Z and SWF10. If slave pooler 2 or 3 is selected as the write device, the output of the receiver amplifier 335 is forced high, which in turn, forces SWF10 high via the jumper connection 333 between SWF00 and SWF10. The input to receiver amplifier 335 is connected to either PBSW200 or PBSW300 depending upon the DCA's assigned pooler number, 2 or 3.

Referring now to FIGS. 4*a*, 4*b* and 4*d*, when the read or write switch is set to the OFF position, 5 volts DC is applied to the input of select function OFF amplifier 336 via OR'ed gates 339 or 340, respectively, this forces the output of the bus driver 337 low; consequently the output of the bus receiver 338 becomes high. This signal is fed to OR GATE 342 and to inverter amplifier 341, which is the Prevent Read Function, thus disabling this device when either the write or the read is off.

The Select Pooling Function (SPF), amplifier 346 sets in the read DCA and the write DCA when the herein above read and write procedures are performed. In examining the gating structure of SPF amplifier 346 (FIG. 4f) it is seen that AND gate 350 sets SPF in the write DCA if the following are true:

a. this particular write DCA is selected to be the write device SWF;
b. the mode operation switch located on the receiver main control station unit 44 on FIG. 1 is set to Data Entry (WMD);
c. the Read or Write switch is not set to the OFF position;
d. this particular DCA is not selected as the read device (PWF). Examining, therefore, AND gate 350 the above conditions reduce to PWF. WMD·SWF in Boolean representation.

The expander gate 349 (FIG. 4*f*) sets the select pooling function Select Pooling Function 346 in the read DCA if the following conditions are true;

a. that particular DCA is selected as the read device SRF on gate 349;
b. the mode of operation switch, located on the transmitter main control station unit 44 on FIG. 1, is set to Data Verify VMD on gate 349;
c. that DCA is not selected as the write device PRF on gate 349;
d. the Read or Write switch is not set to the OFF position PRF.

The Set-Up-Pooler function 347 is set up by the Select Pooling Function 346 when the reset button INT is depressed.

TRANSMITTER AND RECEIVER SET-UP

Figure 5A:
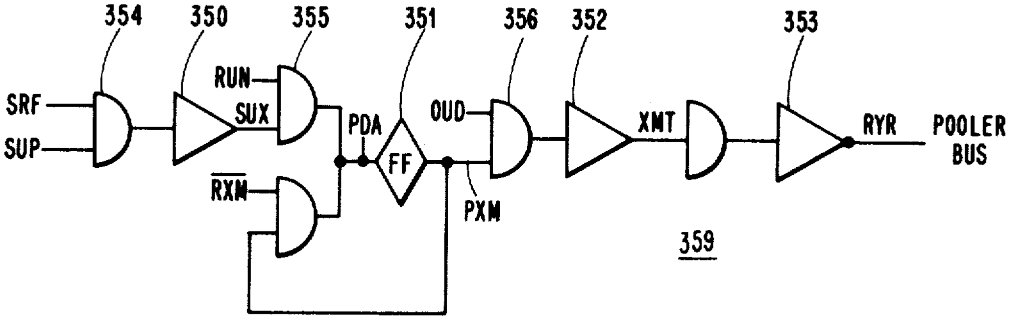
FIG. 5*a* is a logic block diagram of the transmitter set-up.
Figure 5B:
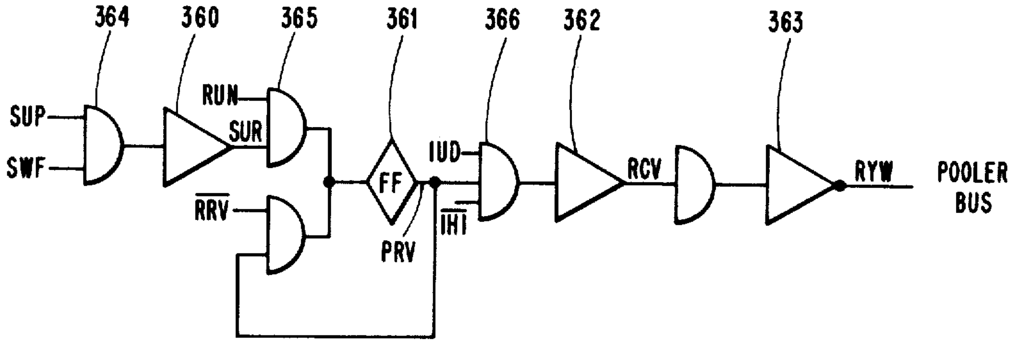
FIG. 5*b* is a logic block diagram of the receiver set-up.

Referring to FIGS. 5*a* and 5*b* the set-up transmitter 359 is enabled when the DCA is selected as the read device by enabling gate 354 with the presence of SRF and SUP obtained as described in the previous discussion. With the signal SUX present on AND gate 355 it is enabled when the run button is depressed setting flip flop 351 which is the Permit Transmit function PXM and is recirculated until a stop code is sensed. Gate 356 is enabled by Output Unit Defined OUD (see hereinafter detailed discussion of FIG. 12d for OUD) and Permit Transmit PXM which drives the output XMT of transmit amplifier 352 high. The Transmit function XMT forces the output of the bus driver 353, Ready Read RYR, low; RYR being low informs the other DCA's in the pooling system that the transmitter is active.

Referring to FIG. 5*b* gate 364 is enabled when the DCA is selected as the write device and SWF·SUP is present by following the procedure herein above described. The output SUR of set-up receiver 360 is driven high; consequently when the run button is depressed the Permit Receive PRU flip flop 361 is set and is recirculated until a stop condition is sensed. With PRV on gate 366 it is enabled when Input Unit Defined IUD (to be later more fully described in FIG. 12d) is high; hence the output RCV of Receive amplifier 362 is high and drives the output RYW of inverter amplifier 363 low and thus informs the other DCA's in the pooler system that the receiver DCA is active.

SYSTEM TIMING

The operation and description of the traffic control sequencer, CCU timing, and CCU strobe generation are described in detail in co-pending application of William F. O'Neill et al previously referred to in this application and will be discussed in this application only when necessary for clarity. Pooler transmitter and receiver timing and signal generation will be described herein by referring to FIGS. 6*a* through 6*d* and FIGS. 12a through 12h inclusive.

TRANSMITTER TIMING

Figure 6A:
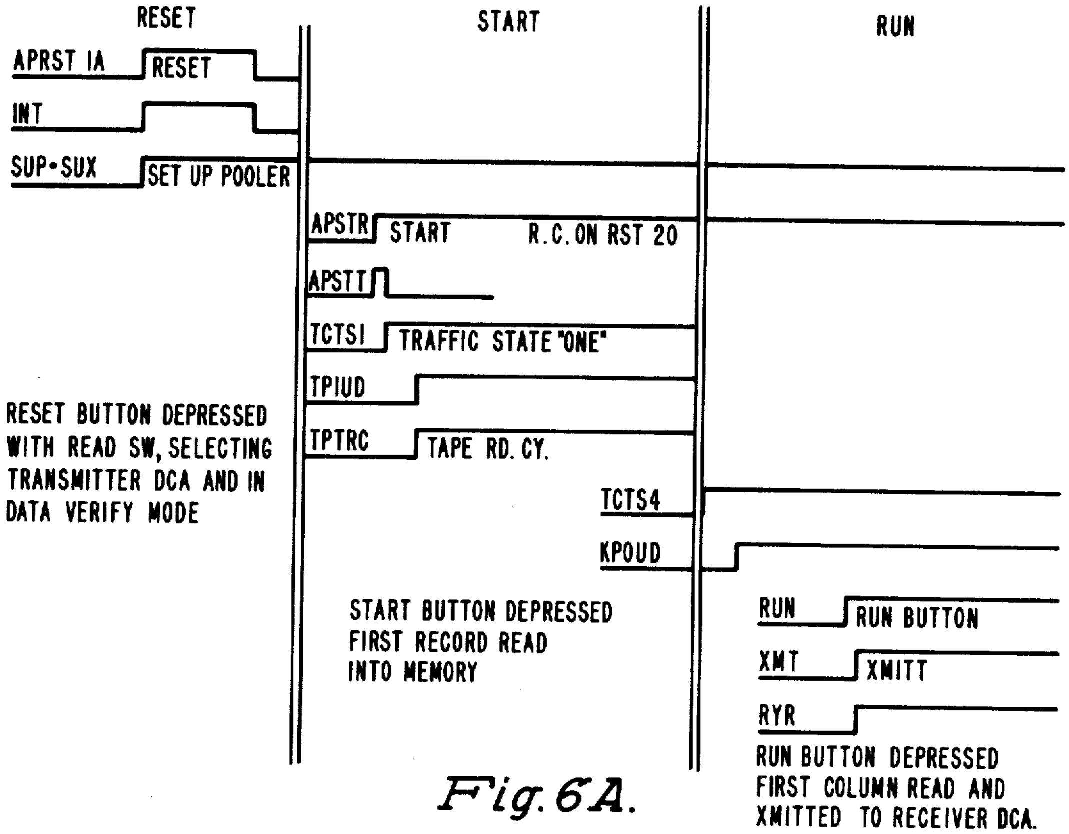
FIG. 6*a* is a timing diagram depicting the pooler read mode set-up.
Figure 6B:
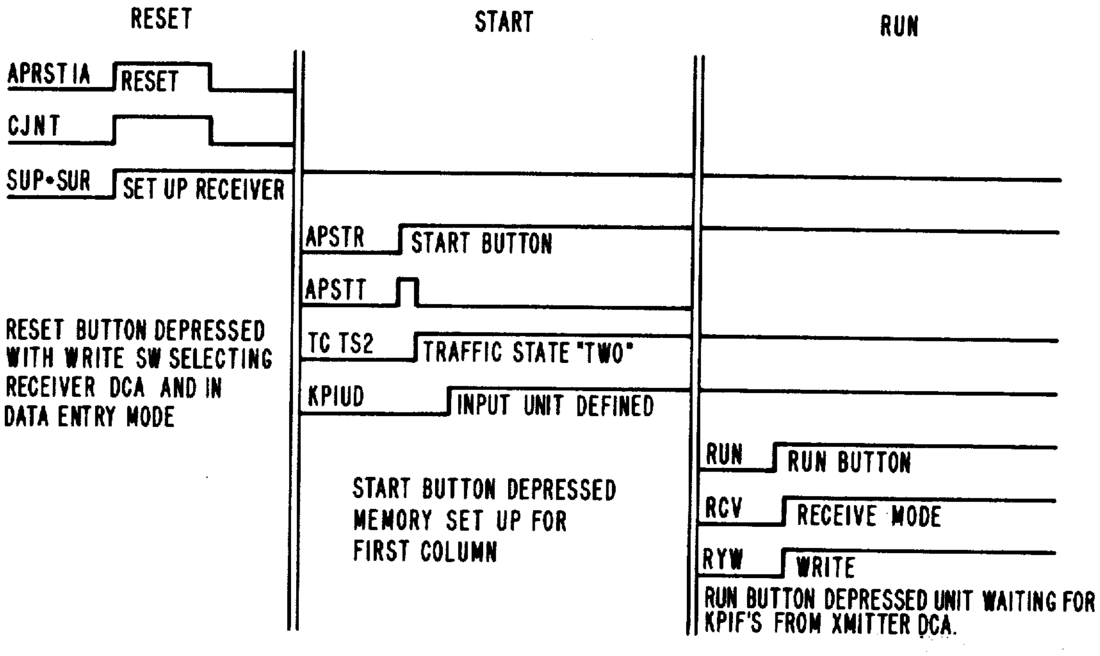
FIG. 6*b* is a timing diagram depicting the pooler write mode set-up.
Figure 6C:
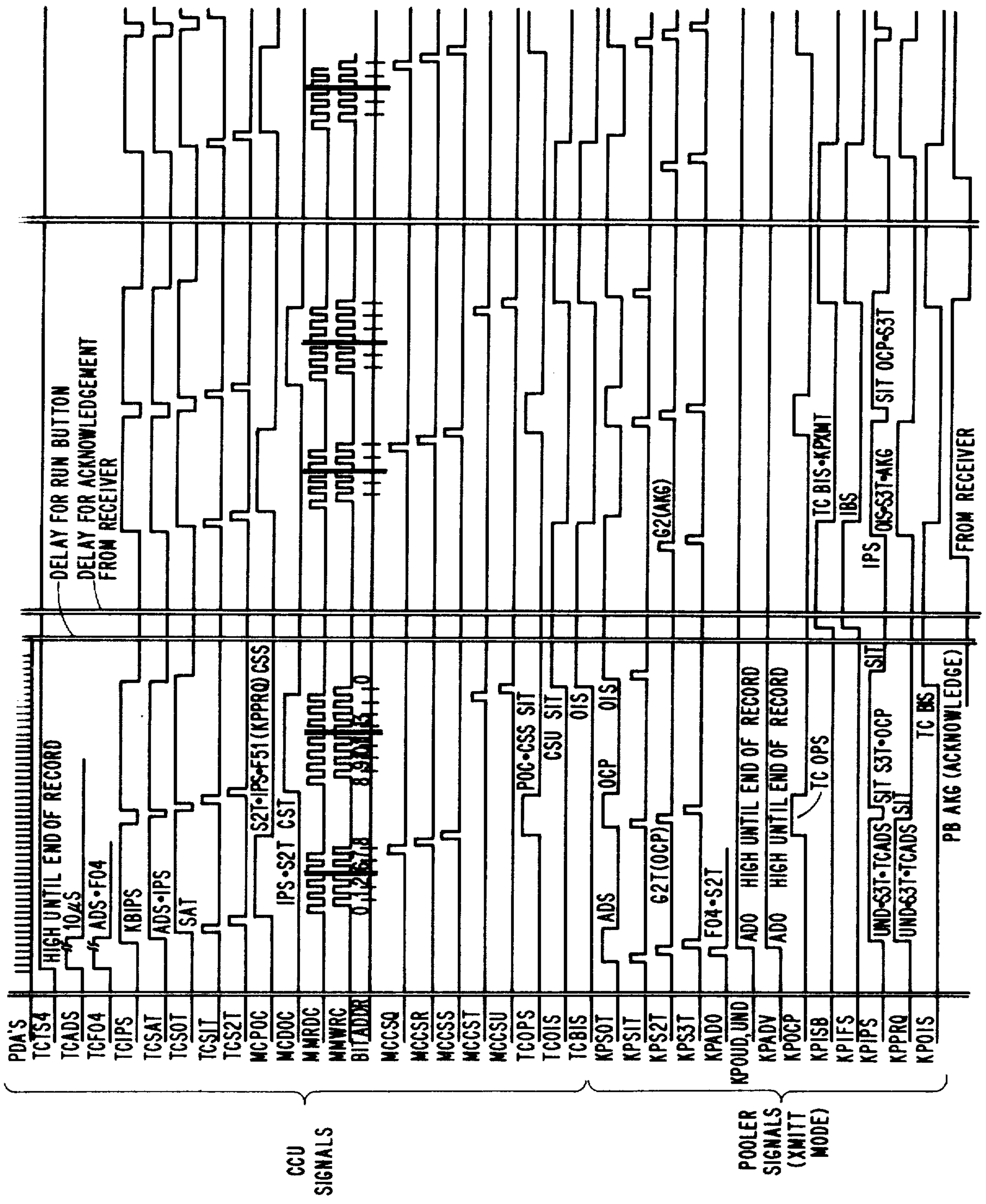
FIG. 6*c* is a timing diagram depicting the transmitter mode operation.
Figure 6D:
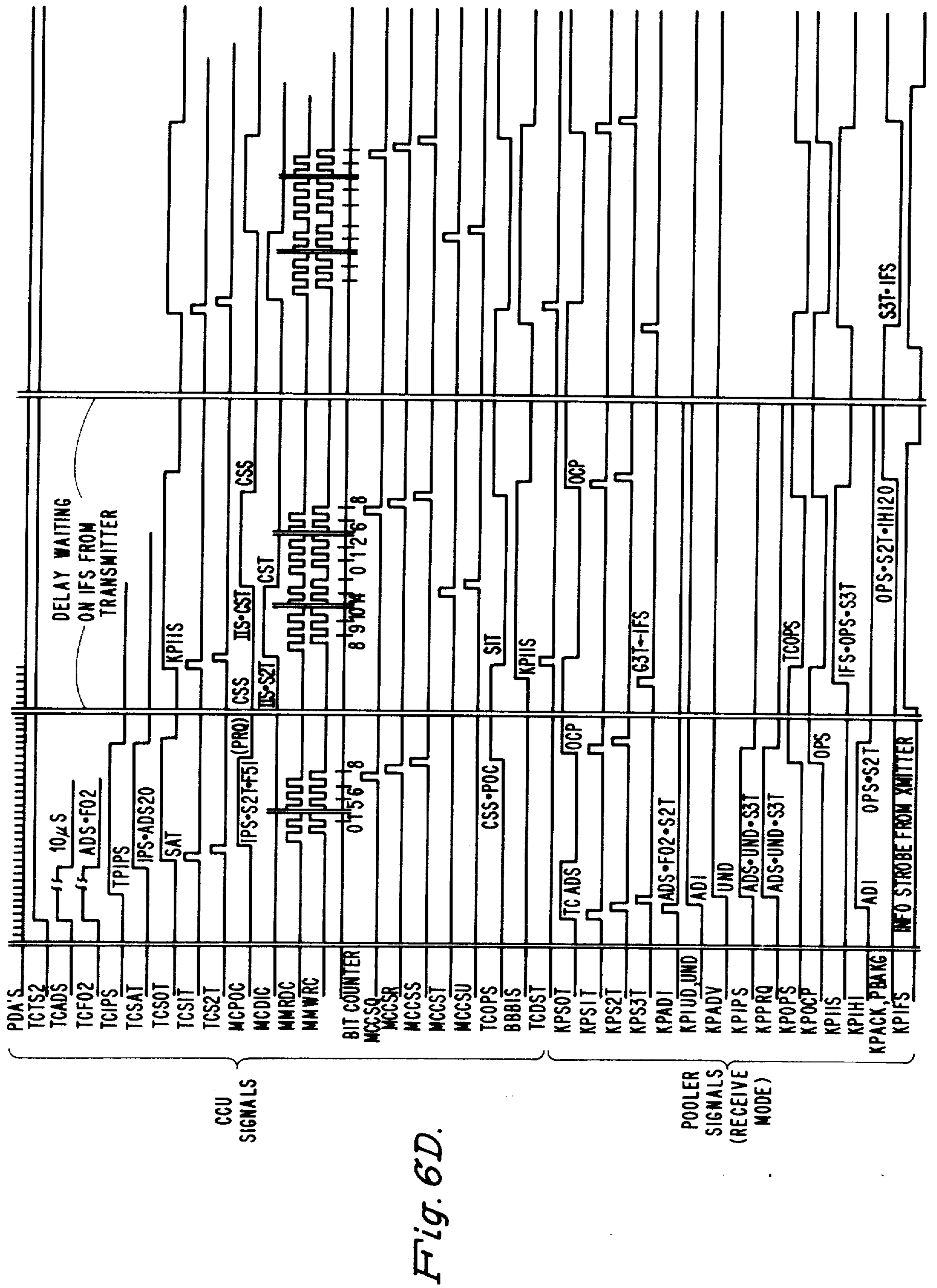
FIG. 6*d* is a timing diagram depicting the received mode operation.
Figure 7:
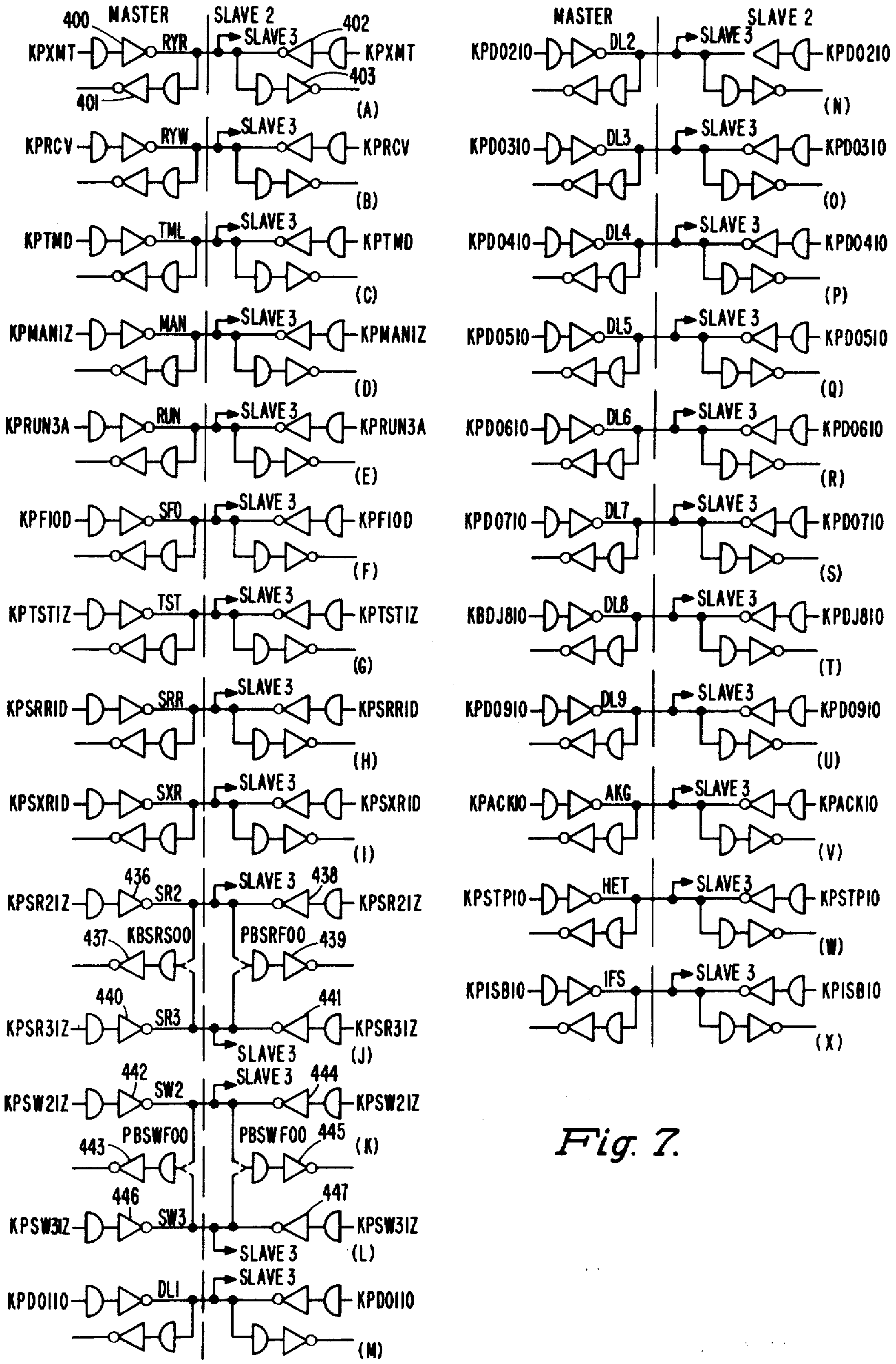
FIGS. 7*a* through 7*x* are logic block diagrams of the pooler bus lines.
Figure 9A:
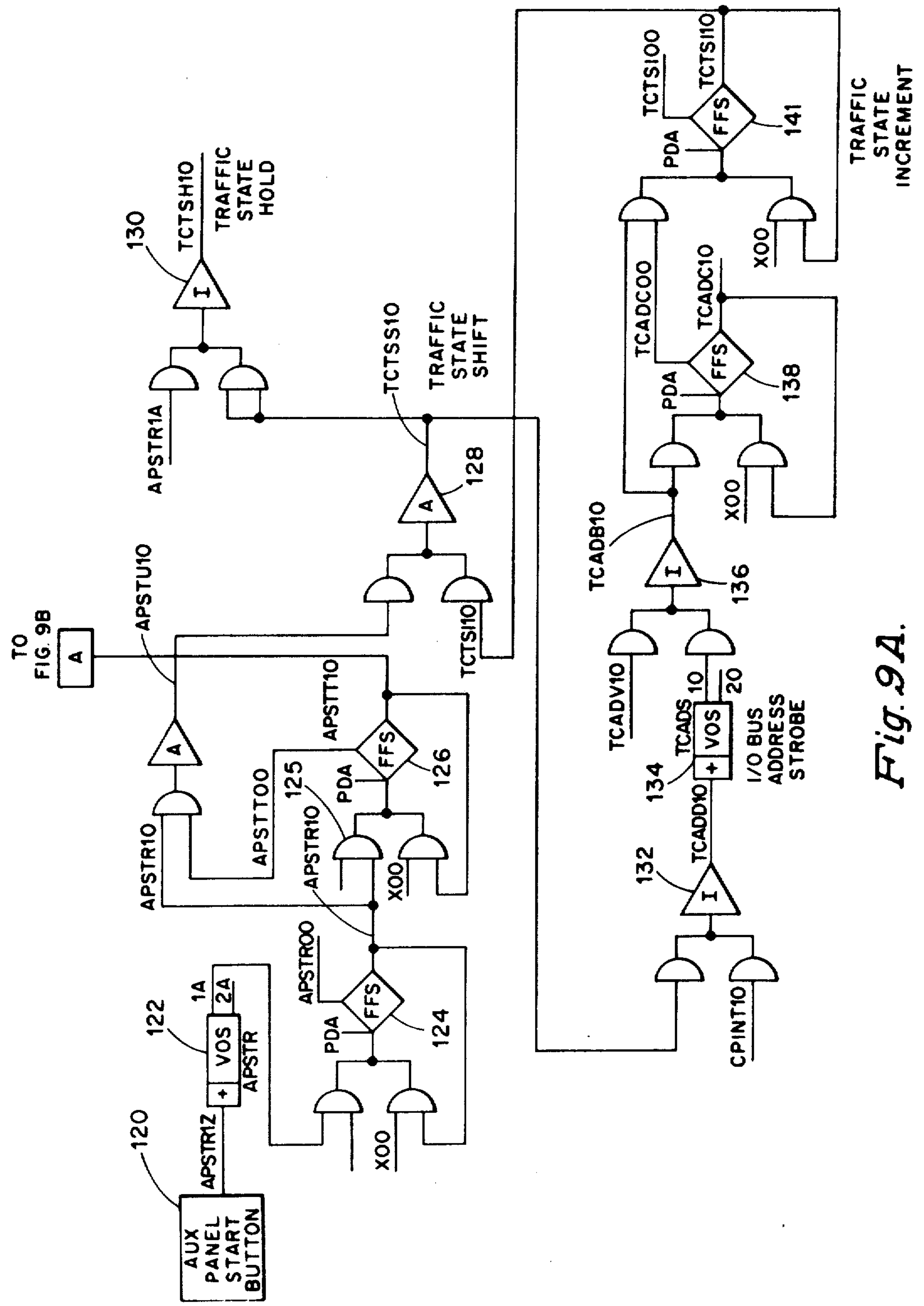
FIGS. 9*a* and 9*b* are logic block diagrams of the traffic state sequencer.
Figure 9B:
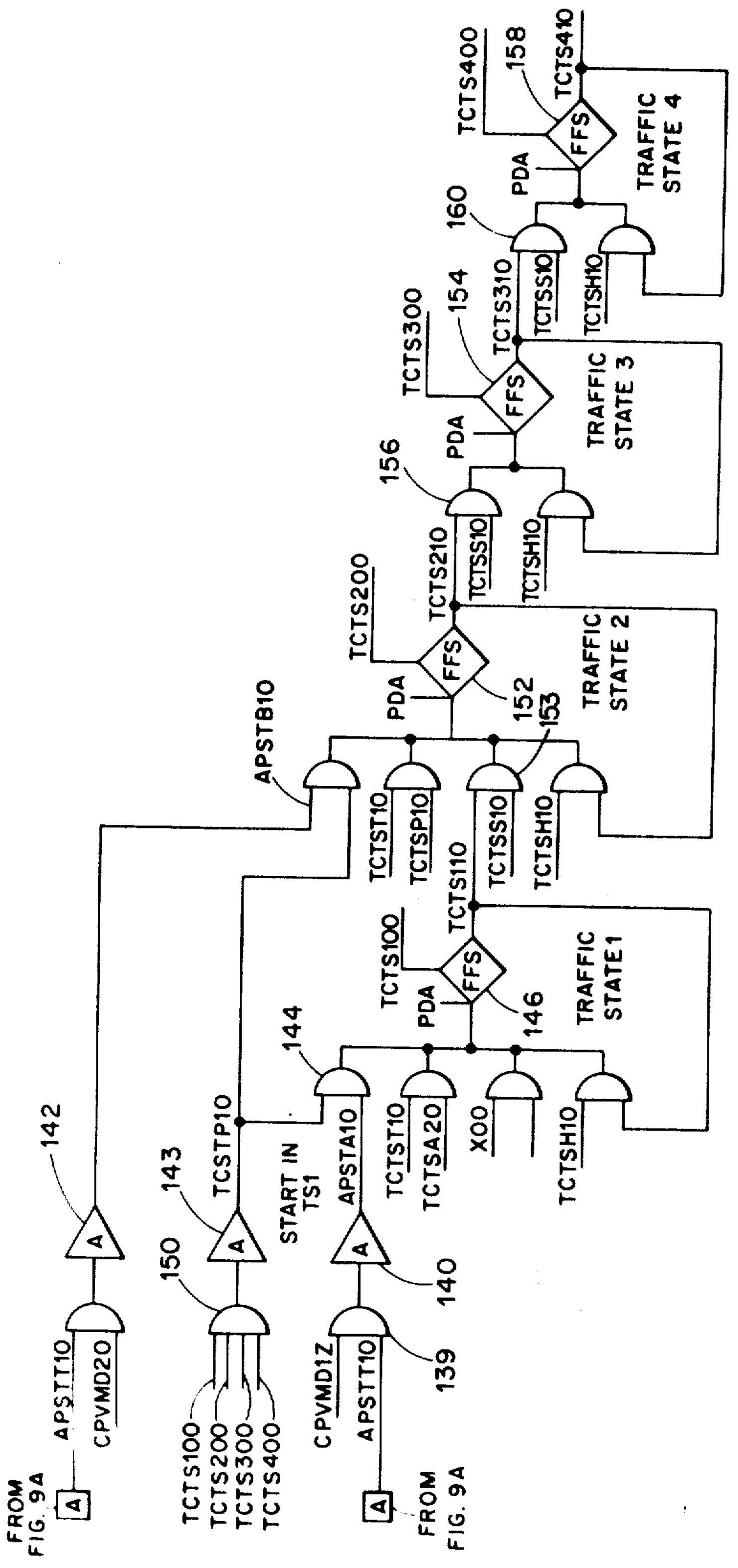
Figure 10:
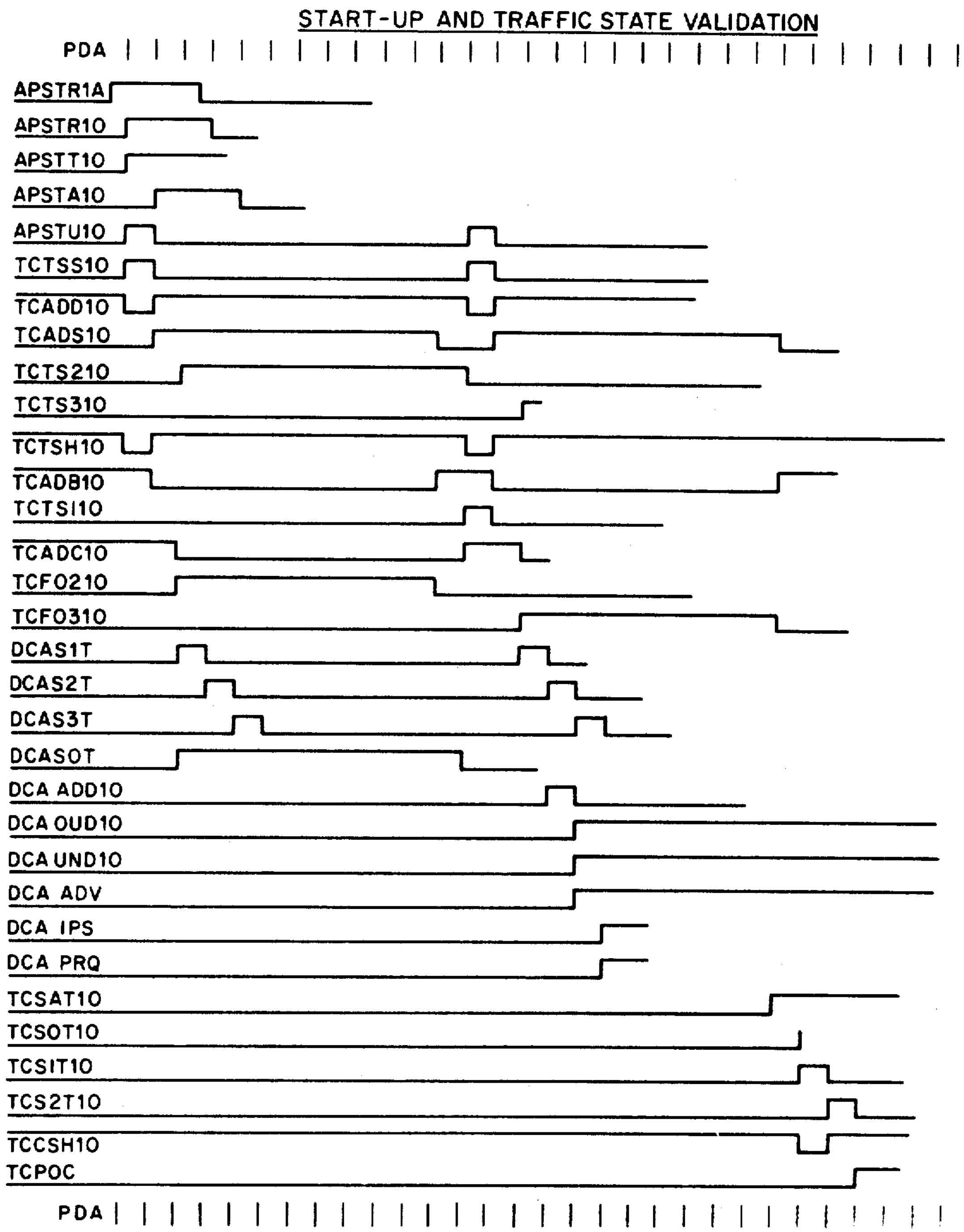
FIG. 10 is a timing diagram showing start-up and traffic state address validation.

The following description is based on the assumption that the pooling system is set up as previously described. Referring to FIGS. 6*a* and 6*c* it is seen that depressing the Reset button located on master pooler adapter control panel initializes the transmitter DCA and the key-to-tape unit. Functions SUP and SUX are enabled as previously hereinbefore described and remain high until the completion of the pooling operation. Depressing the Start button located on the master pooler adapter control panel forces the traffic state sequencer on FIG. 9*b* into traffic state 1 (TCTS1) and the first record is read from tape. After the complete record is read from tape the transmitter traffic state sequencer is incremented to traffic state 4 (TCTS4). The pooler DCA is addressed as the output device KPOUD and the traffic state counter is held at traffic state 4, (TCTS4) by address valid ADV driven by amplifier 206 on FIG. 12*d*. The transmitter DCA now requests the program bits for the first column to be read out of memory during the program output cycle POC (see application of O'Neill et al) and examined for automatic SKIP. When the program bits have been read out of memory IPS (FIG. 12*c*) is set and the data output cycle DOC is requested. The data bits are read out of memory and placed on the I/O bus; bi-directional information strobe, to be later described in reference with FIG. 8, is enabled to inform the transmitter DCA that the information is on the bus. Bi-direction information strobe TCBIS enables output info strobe KPOIS which is used to initiate the transmitter acceptance of the information from the bus after the RUN button is depressed. Depressing the run button enables the transmit function as hereinbefore discussed and permits the information to be accepted off the read I/O bus gated through the transmit DCA and placed on the pooler bus. The pooler bus Information Strobe line KPIFS, (to be later described in reference to FIG. 7) is now set to inform the receiver DCA that information is available on the pooler bus. The transmitter is held in this state until the acknowledge signal KPAKG, (again to be described with reference to FIGS. 7), is received from the receiver. The acknowledge signal is enabled in the receiver when the information on the pooler bus is removed in process. The transmitter, on receipt of the AKG from the receiver, generates a program request KPPRQ for the program bits of the next column; the program bits are then read out of memory and examined for automatic DUP or SKIP operations by the transmitter. (It will be noted that throughout the description of the timing and logic block diagrams the first two letters of the pulse define its origin i.e. KP is Key Pooler, TC is Traffic Controller, etc. — and may be omitted where not necessary.

As function KPIPS is enabled it requests a data output cycle TCDOC to read out of memory the data bits for this column. When the data bits are read out of memory, signal TCBIS informs the transmitter DCA that the data is on the transmitter I/O bus. The information is immediately accepted by the transmitter DCA and placed on the pooler bus. The transmitter is held in this state until the receiver generates acknowledge AKG whereupon the sequence is continued until the complete record is transferred.

RECEIVER TIMING

Referring to FIGS. 6b and 6d, again depressing the reset button on the receiver pooler adapter control panel causes the receiver DCA and the receiver key-to-tape device to be in initialized INT. INT generates the set-up-pooler function SUP and set-up-receiver function SUR, as hereinbefore described, identifying the receiver DCA. Depressing the start button on the receiver adapter control panel forces the traffic state sequencer (FIG. 9*b*) of the receiver CCU into traffic state two (TCTS 2). The input-unit-defined KPIUD flip flop, 208 on FIG. 12*d*, is enabled and drives amplifier 206 on FIG. 12*d* high which generates ADV and holds the traffic state counter at traffic state 2 (TCTS2). The receiver DCA requests program bits from column 1 (KPPRQ) which in turn forces a program output cycle POC. The program bits are read out of memory and examined for automatic DUP and/or skip operations. The receiver is now set up to accept the first character from the transmitter and hold them in this state until data strobe line timing signal KPIFS (FIG. 6*c*) is generated by the DCA transmitter.

Depressing the run button located on the master pooler adapter control panel causes the first character to be placed onto the pooler bus by the transmitter DCA. KPIFS is then enabled and the receiver is informed that the information is on the bus. The receiver gates the information off the pooler bus through the DCA and places it on the pooler receive I/O bus via KPIIS. Input information strobe ITS forces a data input cycle TCDIC into the receiver and writes the first character into the receiver memory. A program output cycle is enabled upon completion of the character being read into memory, and the program bits for the next column are read out of memory and examined for automatic DUP or SKIP operations. AKG (FIG. 7*v*) is enabled to inform the transmitter that the information was received and processed. The receiver DCA is held in this state until the next information strobe is received from the transmitter. This sequence is repeated until the complete record is received.

Figure 12A:
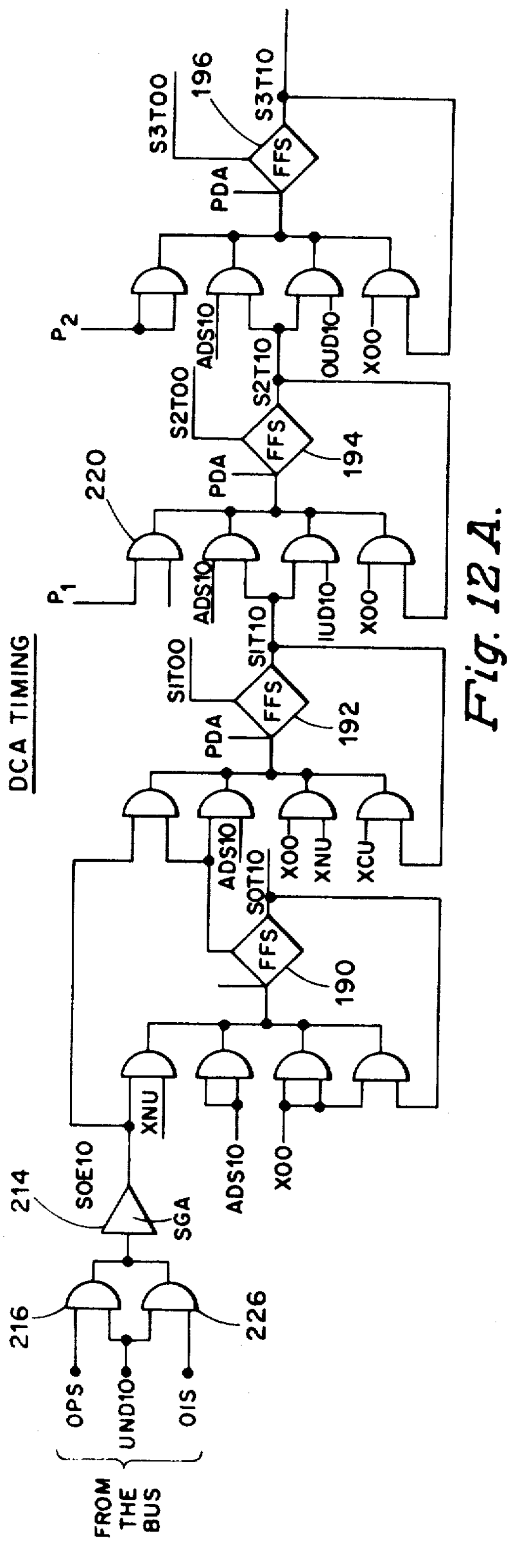
FIGS. 12*a* through 12*h* are logic block diagrams of a DCA's timing unit-defined and strobe generation.
Figure 12C:
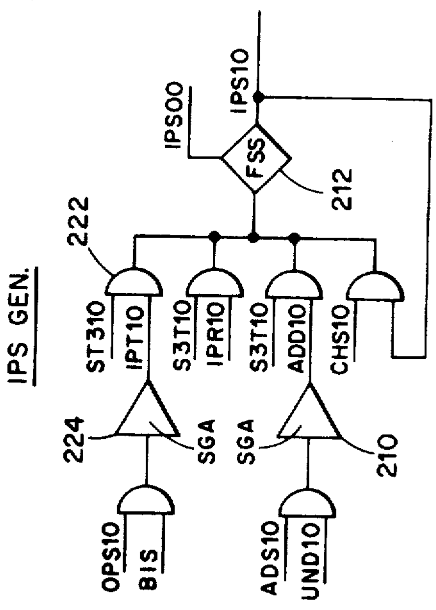
Figure 12B:
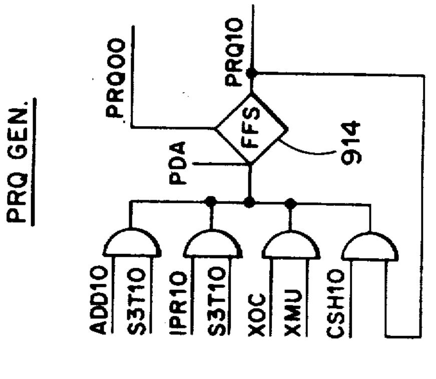
Figure 12D:
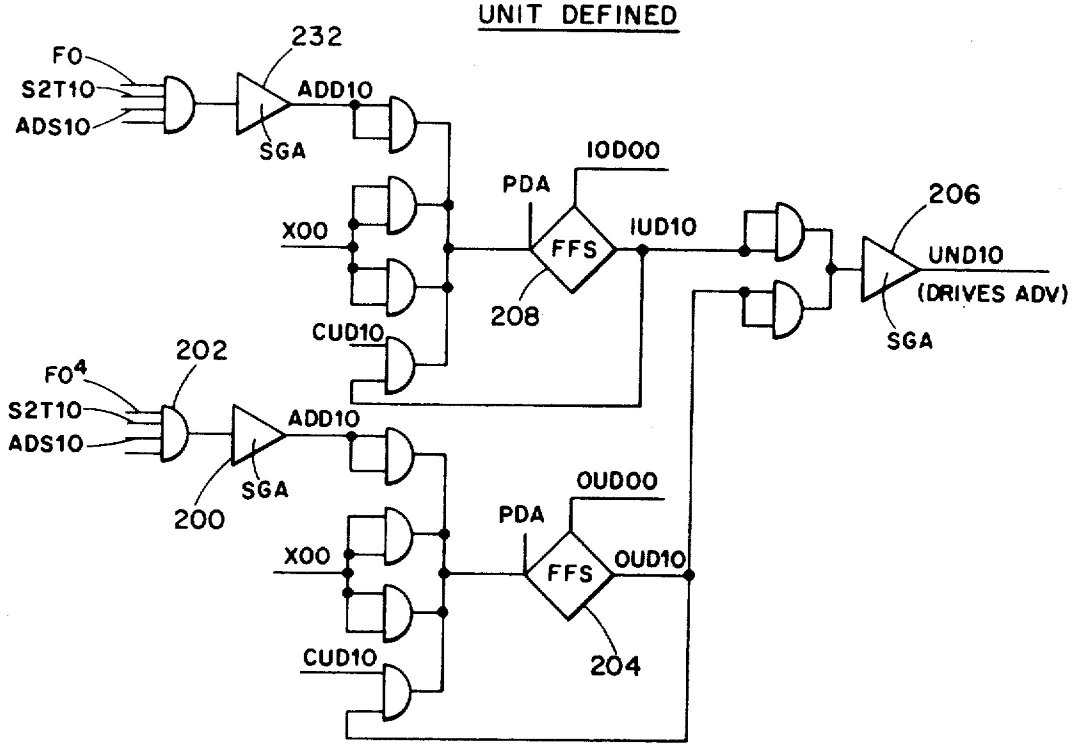
Figure 12E:
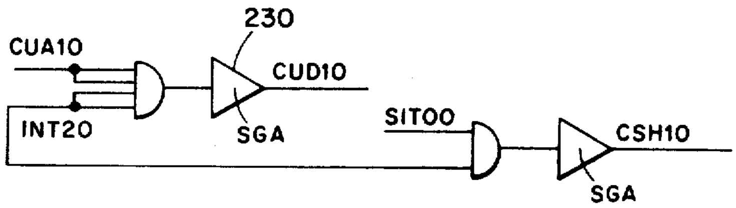
Figure 12F:
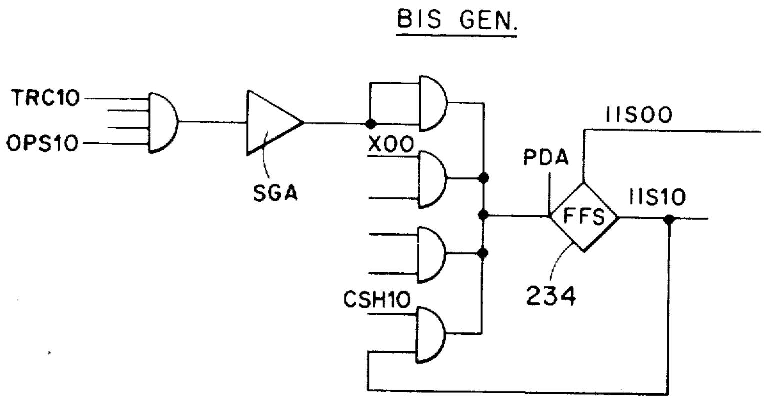
Figure 12G:
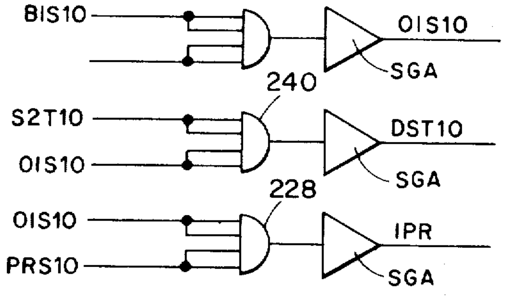
Figure 12H:
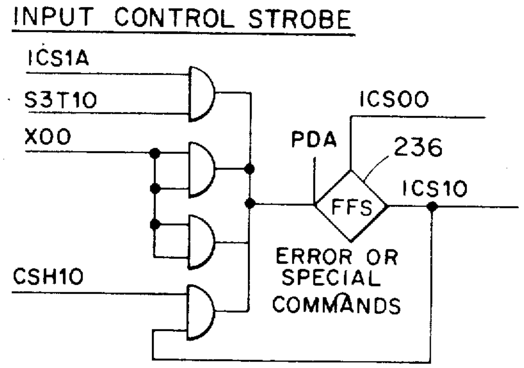
Figure 13:
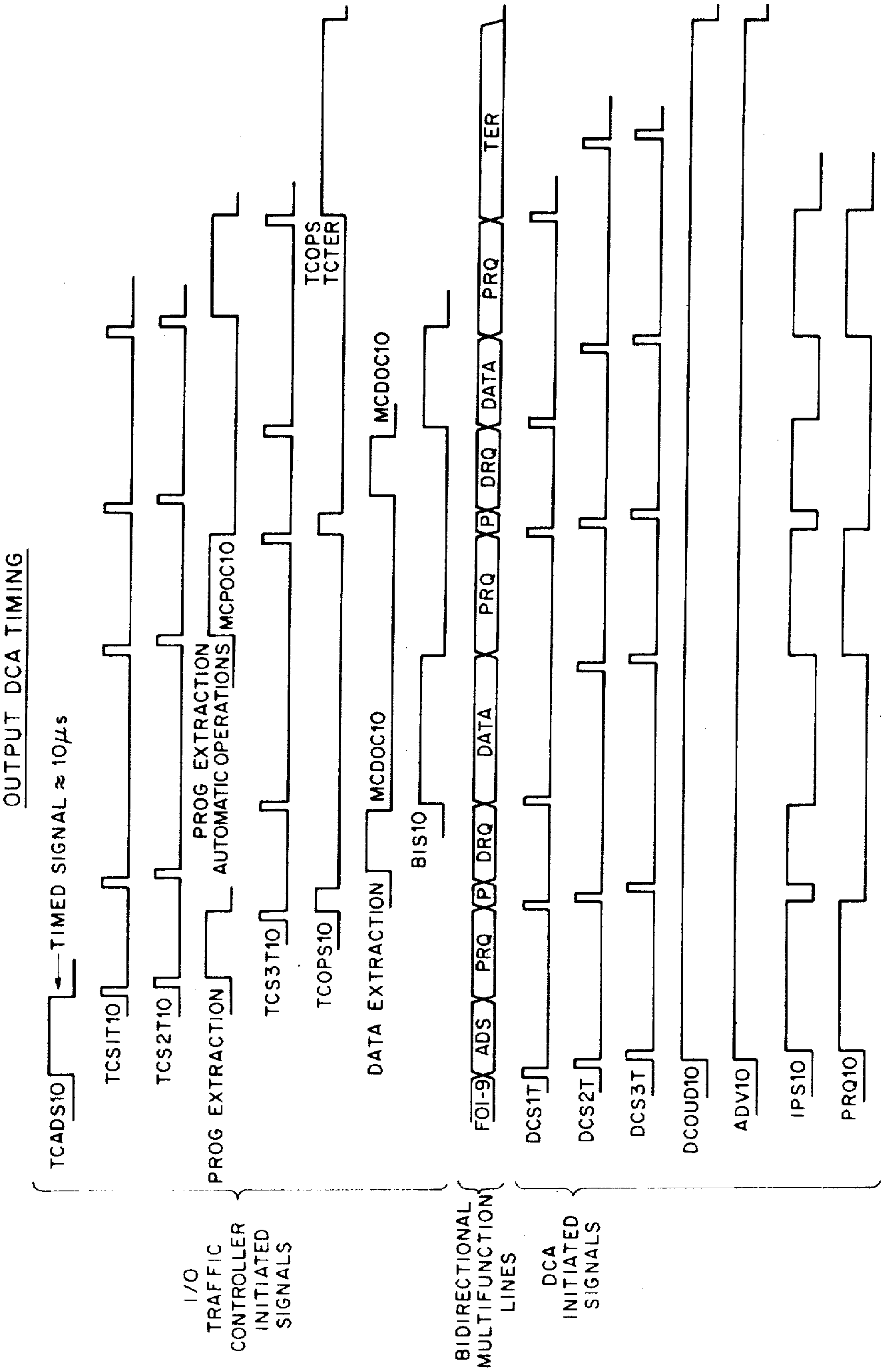
FIG. 13 is a timing diagram depicting a record-length operation of a typical output DCA.
Figure 14:
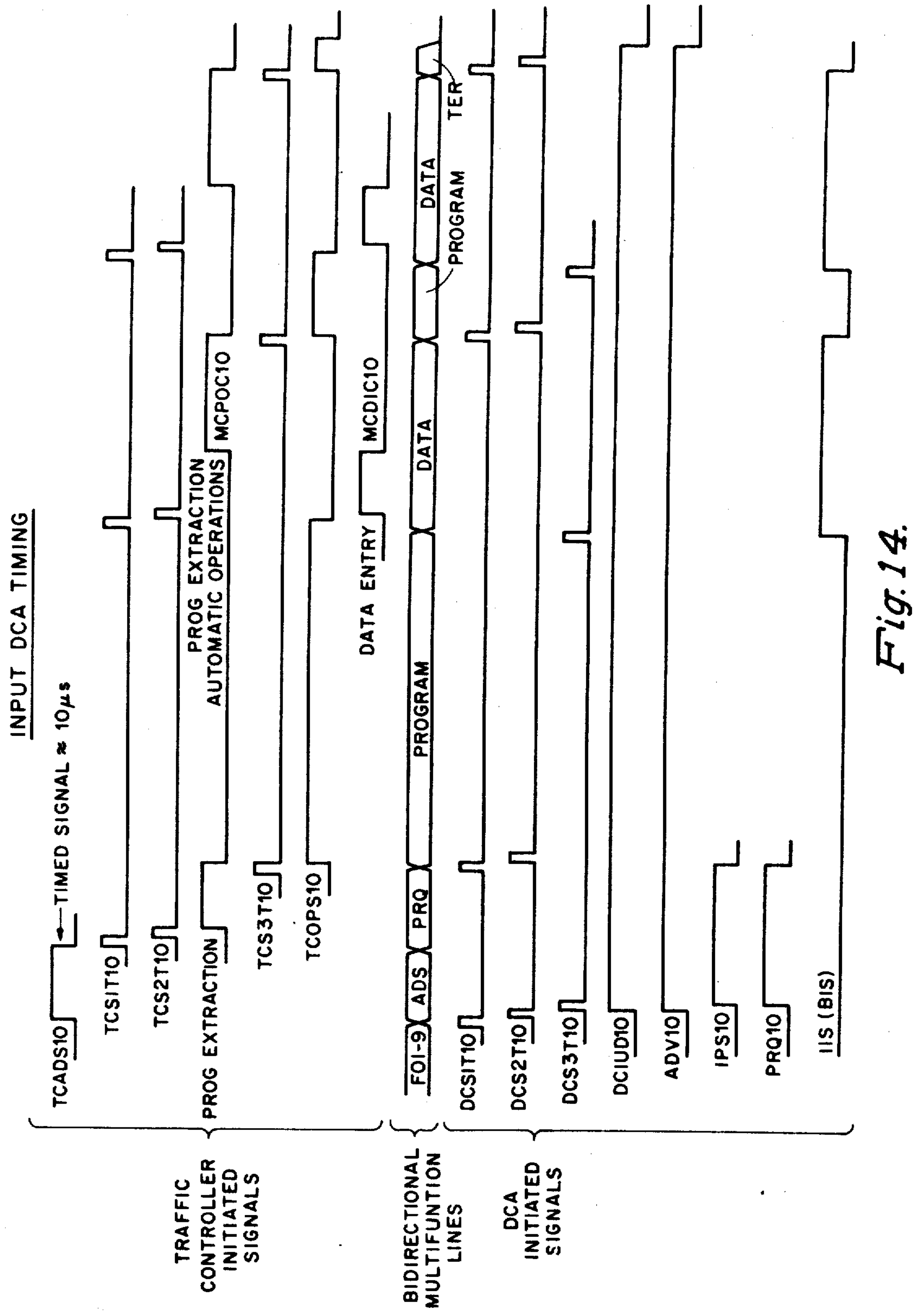
FIG. 14 is a timing diagram depicting a record-length operation of a typical input DCA.

FIGS. 12*a* through 12*h* have been referenced in discussing the timing diagram of FIGS. 6*a* through 6*d*. They will now be hereinafter discussed in more detail referencing the timing diagram since the embodiments of FIGS. 12*a* through 12*c* provide the timing and strobe generation functions for the pooler bus.

When the transmit pooler DCA is addressed as the output device KPOUD by the traffic state controller in traffic state 4 (TCTS 4) as hereinabove described, the transmitter CCU drives the TCADS strobe lines for 10 microseconds, along with the FO (multifunction) line — described in the hereinbefore referred to application of O'Neill et al — corresponding to the traffic state 4 (TCTS4) is driven to generate the traffic state address for traffic state 4. In FIG. 12*a* the receipt of ADS10 from the bus immediately sets sync-flop 190 through AND gate 191 and generates the first timing command in the DCA board, SOT10. SOT10 in combination with ADS signals, sync-flop 192 generating SIT10, which in turn sets syncflop 194 to generate S2T10, which finally sets sync-flop 196 to generate S3T10. On S2T10, ADD10 (FIG. 12*d*) will be set since the ADS10, S2T10, and FO4 inputs to AND gate 202 are satisfied. The fourth terminal on AND gate 202 may be used to inhibit if desired. For example if it is desired to lock out a particular DCA, a signal is applied to the inhibit pin. The output DCA of FIG. 12*d* recognize TS4 as its active state, and activates address valid ADV10 through amplifier 200, the input being determined by the presence of FO4, S2T10, and ADS10 on gate 202.

When ADD10 is satisfied, sync-flop 204 will be immediately set driving a signal OUD10 (output-unit-defined) high. OUD10 immediately drives UND10 through an amplifier 206. UND in turn drives the ADV or address-valid line, one of the single function lines on the I/O bus. (Note that had the particular DCA been an input device, the IUD flop 208 would have been set instead of the OUD flop 204. Both flops 204 and 208 will drive amplifier 206 to generate UND10 and ADV). With ADS10 and UND10 high, amplifier 210 (FIG. 12*c*) is driven high and, together with S3T10 will set sync-flop 212 to generate IPS10. At the same time, the appearance of ADD10 and S3T10 will set sync-flop 914 (FIG. 12*b*) to generate Program Request PRQ10. As can be seen in FIG. 8, the appearance IPS (IPS-$\overline{ICS}$) with PRQ (PRQ being the FO1 line driven high) is a 12. DL1, DL8 — eight data lines;

13. DL9 — one parity line;

14. AKG — one acknowledgment line carrying a signal which indicates a valid response;

15. HLT — one halt line which controls manual or automatic pooler's stop code operation;

16. IFS — one data strobe line carrying a timing signal that indicates data line is valid.

FIGS. **7*j* and 7*k* differ from the above described figures in that two additional drive amplifiers have been added. For example in FIG. 7*j* drive amplifiers 440 and 441, and in FIG. 7*k* drive amplifiers 446 and 447 have been added. Receiver amplifiers 437 and 439 on FIG. 7j, and 443 and 445 on FIG. 7*k* are now switchable between SR2 and SR3 line, and also between SW2 and SW3 lines respectively. By selecting the proper line, for example in FIG. 7*j*, select-read-function for pooler 2, or for pooler 3, may be set up as discussed with reference to FIG. 4*c*; also on FIG. 7*k* by switching between lines SW2 and SW3 in accordance to the operator's desire to set up pooler 2 or pooler 3 as the select-write-function, pooler 2 or pooler 3** may be set up as the write pooler device.

The I/O Bus

The I/O bus connecting the CCU with the DCA's is a "daisy-chained", multiple-line, serial bus. It is described in detail in the specification of William F. O'-Neill et al for "Input/Output Bus" hereinbefore previously referenced.

FIG. 8 is a graphical representation of the I/O bus lines and functions. The bus cable as described, contains a total of twenty five lines.

The I/O bus lines may be divided into three categories;

a. strobe lines (6);

b. bi-directional multi-function lines (9);

c. special purpose function control lines (10).

The strobe lines and bi-directional multi-function lines are employed to interchange control commands, program information, and input or output data to and from the system memory. Special purpose function control lines are used to provide interchange of information with the CCU which is required in the continuous nature throughout the input and output operations.

The six strobe lines are used to maintain I/O timing and to gate and control the multi-function lines. Two of the lines BIS (bi-directional information strobe) and ADS (addressed strobe) are signal line functions; whereas the other four lines OPS (output program strobe), IPS (input program strobe) OCS (output control strobe) and ICS (input control strobe) are dual function lines that require two lines together to activate a strobe function. The dual line functions make possible six controlled conditions, three input and three output.

The multi-function lines are all bi-directional; each may have both a driver and receiver circuit attached to them in the CCU interface and in each of the DCA interfaces.

Referring again to FIG. 8, a matrix array is shown in the upper portion of the table, setting forth the relationship between the multi-function lines FO1 through FO9 and the six strobe lines previously mentioned. The data or control information to be carried on function lines F01 through FO9 is determined by the state of the six strobe lines. The bottom portion of the table shows the ten single function lines.

Traffic Controller and CCU Timing

The traffic controller and CCU timing FIGS. **9*a*, 9*b*, 10, 11, 13 and 14** are described in detail in previously identified application of O'Neill et al., and will only be discussed herein to the extent necessary for complete understanding of the invention.

The traffic state sequencer (FIGS. **9*a* and 9*b***) may be modified 4-bit ring-counter which provides four sequentially addressed traffic state TS1 to TS4. These states are used to control the addressing sequence of the various adapters attached to the I/O bus. Once the traffic state is entered, the state is maintained until the address device has completed a full record length operation.

Beginning a cycle will normally cause the system to enter TS2, if the mode-switch previously referred to, and located in the main control station unit 44 of FIG. 1, is set in the data-entry, search, program-entry or program-verify modes; and will enter TS1 if the mode-switch is in data-verify mode. It has been previously stated that the transmitter pooler when properly set up, enters traffic state one (TS1) and is incremented to traffic state 4 (TS4) whereas the receiver pooler when properly set up enters traffic state 2 (TS2).

When an address strobe (TCADS) is issued by the traffic controller, the active traffic state (TS1–TS4) will cause a corresponding I/O multi-function line (contained in the I/O bus) to be active. If a DCA with this address is attached, and in the "on" state, it will activate the address valid line (ADV) before TCADS times out. This will prevent the traffic state sequencer from incrementing to another state. When the DCA has processed a full record of information, it will deactivate ADV, and the traffic state sequencer will increment and issue a new address TCADS. If the ADV line is inactive when TCADS times out, an immediate increment to the next traffic state will result and the next address will be issued.

The I/O interface detects all DCA generated strobes except ADV, and decodes the multi-function lines for control information in control information logic. Output strobes are also generated as specified by the memory controller unit and multi-function lines are coded with output data and control information, both in the controlled information coding logic.

While the invention has been shown and its operation described with key-to-tape units, the principles of the input-output bus and the pooler-bus may be applicable to a variety of other data processing systems. Other modifications of this system will become apparent to those skilled in the art, and the specification is not necessarily limited to that application specifically described.

What is claimed is:

1. A data processing system comprising:

a. first and second central processor units (CPU's), each of said first and second CPU's having a buffer memory respectively;

b. first and second peripheral control units (PCU's);

c. first and second input/output (I/O) buses coupling said first CPU to said first PCU, and said second CPU to said second PCU, respectively;

program request which will be transmitted over the I/O bus to CCU. It should be noted, although it is not essential to the understanding of the instant invention, that if the SKIP and DUP functions are not required, FO2 and FO7 would also be driven with PRQ, by means not shown.

Further action in the DCA now awaits the CCU reply to the program request. After time-out of ADS, the CCU recognizes the incoming PRQ signal, enacts a program output cycle (POC) to extract the program code from the memory, and places this code on FO lines of the I/O bus together with OPG (FIG. 8). (The memory cycles will not be discussed in detail as they may be conventionally carried out in the memory controller and main memory sections of the unit.) Since the OPG strobe transmitted by the CCU is OPS·$\overline{OCS}$, the input to flip-flop 214 (FIG. 12*b*) will detect CCU'S OPG strobe.

Upon receipt of OPS with UND high, amplifier 214, (FIG. 12*a*) generates SOE10 which sets SOT10 and SIT10 through sync-flops 190 and 192. SIT resets IPS and PRQ by dropping CHS10 (FIG. 12*e*), and the incoming program code on lines FO1 through FO5 of the bus may be decoded and utilized if required, by means specific to the particular DCA, not shown.

With the output unit defined (FIG. 12*d*) (as it is in this case since the DCA is an output DCA) flop 208 resets and the timing stops after the SIT until the program has been assimilated and the signal is applied to terminal P1 (FIG. 12*a*) which is an input to AND gate 220 and an output which is OR'ed to the input of the sync-flop 194. When a signal is applied to P1 to set S2T10, S3T10 will follow on the next PDA pulse on OUD10, and S2T10 and with S3T10 and OPG true IPS will set via AND gate 222 on FIG. 12c and amplifier 224. The generation of IPS alone on the bus is recognized by the CCU as a data request.

Figure 11A:
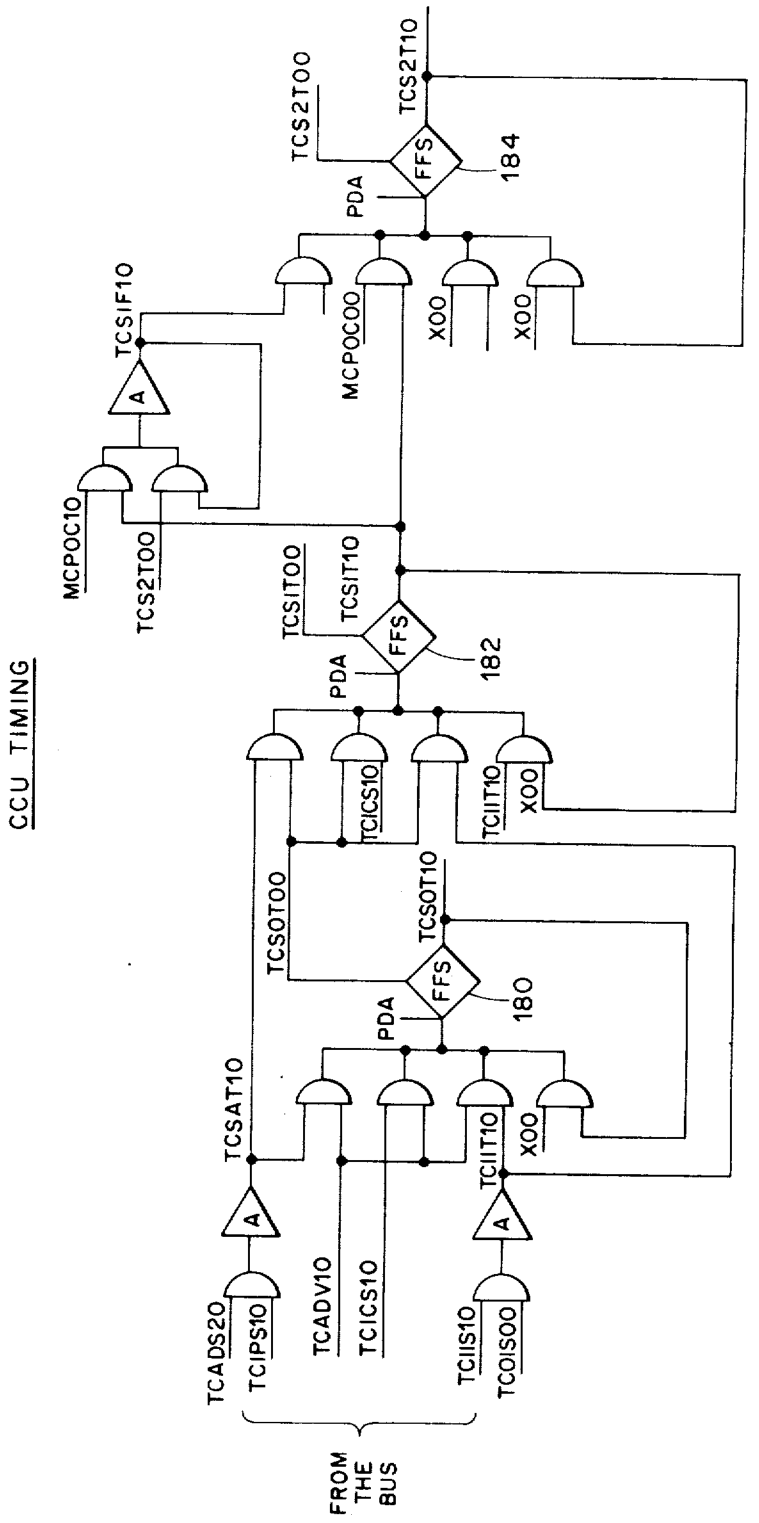

The CCU will initate a DOC in the memory controller and reply to the data request with the memory column data code on the FO lines and BIS. The BIS is generated as shown in FIG. 11*b* upon receipt of commands from the memory controller and main memory unit. BIS is known as OIS when used to output data and is known as IIS when used to input data. Logic within both the CCU and DCA, not shown here, is used to discriminate between these usages.

BIS is received as one input of AND gate 226 (FIG. 12*a*) which, along with, UND10 drives amplifier 214 to produce SOE10, and SIT. SIT again will reset IPS and the data code will be utilized by the attachment, when it is ready. It will accomplish this by again triggering S2T through P1. S2T and OIS will cause the DCA data strobe DST10 (FIG. 12G) to go high by firing gate 240. This will also activate S3T.

With OIS true, whenever acknowledge signal AKG is received from receiver DCA, AND gates will set IPS (FIG. 12*c*) and PRQ (FIG. 12*b*) on S3T and a new program request and a new data request will be sent down the bus. The above sequence of program request then data request will be repeated for every column of the memory until a terminate signal (TER) is received.

The initial operations with respect to the receiver DCA will be similar to that of the transmitter DCA. Since TS2 is an input state when ADS is strobed at TCTS2, in receiver DCA, amplifier 232 (FIG. 12*d*) will drive sync-flop 208 to generate the input unit defined or IRD signal which in turn will drive amplifier 206 to develop UND10 to activate ADV. IPS·PRQ is again issued and the CCU will return OPS with the first program character. The receiver DCA will fire SIT and S2T but inhibit S3T until the first data character to be transmitted to CCU is in its register (not shown). At this time S3T is allowed through a signal applied at P2, and IIS (this DCA's BIS line on it I/O bus) is activated by data register signal with a data character.

The receiver CCU will detect BIS, reset OPS at SIT by dropping TCCSH10, strobe the data into the memory local register MLR at S2T and perform a data input cycle DIC placing the data in memory. This is followed by a program output cycle POC which extracts the next program and activates OPS with the program character. As can be seen, BIS times and specifies the data and serves as an automatic program request.

This operation continues as above until the CCU issues TER to indicate the end of record again, IUD is reset and ADV is deactivated. The receiver CCU will then increment to TS3, time-out and increment TS4 where the received data may be written on tape through the tape DCA which in this case will perform as an output DCA. The input controls strobe (ICS) 236 (FIG. 12h) is used when the DCA wishes to send error or special control information to the CCU.

POOLER BUS

The pooler bus coupling the receiver DCA's with the transmitter DCA consists of twenty five bi-directional lines shown on FIGS. 7*a* through 7*x*. Each line has at least one driver and one receiver amplifier in the master DCA and also one driver and one receiver amplifier in the slave DCA. Hence FIG. 7a represents the read-ready line RYR and has a driver amplifier 400 and a receiver amplifier 401 initiating the line in the master DCA whereas a driver amplifier 402 and receiver amplifier 403 terminates the line in the slave DCA. All the hereinafter described lines except for FIGS. 7*j* and 7*k*, will be similar in structure to the above described FIG. A. Referring to FIGS. 7*a* thru 7*x* the following lines comprise the pooler or peripheral bus:

1. RYR — one read-ready line which indicates the proper read device set up;
2. RYW — one write-ready line which indicates proper write device set up;
3. TML — one tape-mark record line which signals detection of a tape mark record;
4. MAN — one manual line which selects on record/run command operation;
5. RUN — one run-line which initiates test, manual or, automatic pooler operation;
6. SFO — one select-off line which identifies either read or write switch set to the off position;
7. TST — one test line which selects one column/run command operation;
8. SRR — one run confirmation line which insures that the receiving pooler has accepted the command;
9. SXR — one run-confirmation line which insures that the transmitting pooler has accepted the command;
10. SR2 and SR3 — two read select lines which select proper read device;
11. SW2, SW3 — two write select line which select proper write device;

d. a peripheral bus coupling said first and second PCU's;

e. first means coupled to said first and second I/O buses and to said pooler bus for asynchronously transmitting or receiving request and acknowledge signals between said PCU's under control of said PCU's;

f. and second means coupled to said first and second I/O buses and to said pooler bus, said second means for asynchronously and bidirectionally transmitting or receiving parallel control and data signals simultaneously between said buffer memories in each of said CPU's over said peripheral and first and second I/O buses, under control of said PCU's.

2. A data processing system as recited in claim 1 including third and fourth means for asynchronously and bidirectionally transmitting control and data signals from said first CPU to said second PCU or from said second CPU to said second PCU over said first or second I/O bus, respectively, under control of signals from said first and second I/O buses.

3. A data processing system comprising:

a. a plurality of central control units (CPU's), each of said CPU's having a buffer memory;

b. a plurality of input/output buses coupled one each to one each of said central control units;

c. a plurality of peripheral control units (PCU's) coupled one each to one each of said input/output buses;

d. a pooler bus coupled to said peripheral control units (PCU's) for carrying information or control signals therebetween;

e. first logic means coupled to said input/output buses and to said pooler bus for providing control signals for asynchronous transmission or reception of information or control signals between said buffer memories of said CPU's, said information and/or control signals carried by said input/output and pooler buses; and f. second logic means coupled to said input/output buses and to said pooler bus for providing communication signals for asynchronously requesting and acknowledging information between said PCU's, said second logic means under control of said PCU's.

4. A data processing system as recited in claim 3 including first selection means for enabling at least one of said peripheral control units (PCU's) for transmission of information and control signals between said PCU's and second selection means for enabling at least a second of said peripheral control units (PCU's) for reception of information and control signals between said PCU's.

5. A data processing system as recited in claim 4 wherein said peripheral devices are key-to-tape units wherein one peripheral device comprises a master key-to-tape unit and the other peripheral devices comprise slave key-to-tape units.

6. A data processing system as recited in claim 3 wherein said logic means include synchronous timing means for providing synchronous timing signals.

7. A data processing system as recited in claim 6 wherein said logic means further include asynchronous timing means for providing asynchronous timing signals, said asynchronous signals asynchronously timing the processing of the information carried by said I/O and pooler buses, and the synchronous timing signals synchronously clocking said asynchronous signals.

8. A data processing system as recited in claim 7 wherein said logic means further include holding means for holding the information signals carried on said pooler bus on said pooler bus until released by release means responsive to said synchronous timing signals.

9. A data processing system comprising:

a. at least one transmitter central control unit and at least one receiver central control unit;

b. at least one transmitter input device, and at least one receiver output device;

c. a transmitter input/output bus and a receiver input/output bus each bus having its own plurality of parallel multifunction bidirectional and single function bidirectional lines;

d. first logic means in said transmitter central control unit for generating a plurality of traffic states, said first logic means coupling said transmitter input/output bus to said transmitter control unit;

e. a second logic means in said receiver central control unit for generating a plurality of traffic states, said second logic means coupling said receiver input/output bus to said receiver central control unit;

f. third logic means coupling said transmitter input device to said transmitter input/output bus, said third logic means being responsive to one or more of the traffic states generated by said first logic means;

g. fourth logic means coupling said receiver input/output bus, said fourth logic means being responsive to one or more of the traffic states generated by said second logic means; and h. a pooler bus having its own plurality of parallel bidirectional lines, said pooler bus coupled to said third and fourth logic means, and said pooler bus being responsive to said third and fourth logic means for transmitting substantially simultaneously and in parallel, data signals from said transmitter input/output bus to said receiver input/output bus.

10. A data processing system as recited in claim 9 wherein said plurality of lines of said pooler bus comprise at least two groups of lines, said groups being data lines and control lines.

11. A data processing system as recited in claim 10 wherein said plurality of lines of each of said receiver and transmitter input/output buses comprises two groups of lines, said two groups of lines of said receiver and transmitter input/output buses being parallel bidirectional single function control lines and parallel bidirectional multi-function data lines.

12. A data processing system as recited in claim 9 wherein said traffic states generated by said first and second logic means are four in number, traffic states 1, 2, 3 and 4, and wherein traffic states 1 and 2 are essentially input states, and traffic states 3 and 4 are essentially output states.

13. A data processing system as recited in claim 12 including a first and second record size memory unit in said transmitter and receiver central control units, respectively, wherein data is entered into said first memory unit during traffic state 1 of said transmitter and transmitted to said second memory unit during traffic state 4 of said transmitter and traffic state 2 of said receiver and wherein data is released from said second memory unit for recording during traffic state 4 of said receiver.

14. A data processing system as recited in claim 13 wherein said transmitter central control units and said transmitter input device and said receiver central control units and said receiver output device comprise in combination transmitter and receiver key-to-tape devices, respectively, each of said key-to-tape devices having mounted thereon computer compatible magnetic tape, and each of said transmitter key-to-tape devices including means for reading data from the magnetic tape mounted thereon into said first record size memory unit, and each receiver key-to-tape device including means for writing data from said second record size memory onto the magnetic tape mounted on said receiver key-to-tape device.

15. A data processing system as recited in claim 9 including first selection means for enabling selected ones of said transmitter central control units for parallel transmission of information or control signals carried by said transmitter input-output bus, and second selection means for enabling selected ones of said receiver central control units for parallel reception of information or control signals carried by said receiver input/output bus.

16. An input/output control system comprising:

a. I/O bus means having a plurality of parallel multi-function and single function bidirectional lines for the parallel transmission or reception of data signals on selected ones of said parallel bidirectional multi-function lines of said I/O bus means under control of signals on said parallel bidirectional signal function lines of said I/O bus means;

b. pooler bus means having a plurality of parallel bidirectional lines for the parallel transmission or reception of data on selected ones of said parallel bidirectional lines of said pooler bus means under control of signals on said single function bidirectional lines of said I/O bus means;

c. a traffic controller coupled to said I/O bus means and pooler bus means for sequentially establishing a plurality of traffic states;

d. first means responsive to said traffic states for establishing signals for controlling the parallel flow of information in response to said traffic states said first means coupled to said I/O and pooler bus means;

e. second means coupled to said I/O and pooler bus means for placing information and control signals on said I/O and pooler bus means;

f. and third means coupled to said I/O and pooler bus means for removing information and control signals from said I/O and pooler buses.

17. An input/output control device as recited in claim 16 wherein said I/O bus means comprises an array of control and signal lines in columns and rows, respectively, and said pooler bus means comprises *d* bidirectional data lines and *c* bidirectional control lines where *d* is the number of bidirectional data lines and *c* is the number of bidirectional control lines.

18. An input/output control device as recited in claim 17 wherein *d* is equal to 9 and *c* is equal to 16.

19. In combination with a data processing pooling system comprising a master central control unit (CCU) and a slave central control unit, a plurality of input-output buses coupled to said master and slave control units, a master device control area (DCA) and a slave device control area (DCA) coupled to said input-output buses, and a pooler bus coupled to said master and slave DCA's:

a. unit-defined-logic means and said master and slave (DCA's) for generating address valid signals in response to signals from said master and slave central control units, said address valid signals for notifying the master (CCU) that the slave (CCU) is initialized to receive information from the master (CCU); and, b. A master and slave (DCA) timing logic means for generating sequential DCA timing pulses for sequentially initiating the generation of control signals.

20. The combination as recited in claim 19 wherein the number of sequential timing pulses generated in each DCA timing logic means is four.

21. The combination as recited in claim 20 including means responsive to the sequential DCA timing pulses for generating request and acknowledge signals from said master and slave DCA's to said master and slave central control units CCU's, and for generating signals for resetting said unit-defined-logic means.

22. In a data processing pooler system comprising at least a master and a slave central control unit (CCU) each having a traffic controller and record memory, a master and slave device control area (DCA), a master I/O bus coupling said master CCU and master DCA, and a slave I/O bus coupling said slave CCU and slave DCA, and a pooler bus coupling said master and slave DCA's:

a. first means coupled to said master record memory, said first means for reading information out of said master record memory and a first auxiliary means coupled to said master record memory and said master I/O bus, said first auxiliary means for placing the information on said master I/O bus;

b. second means coupled to said master I/O bus and to said master DCA, said second means for gating the information from said master I/O bus to said master DCA;

c. third means coupled to said master DCA and to said pooler bus, said third means for gating the information from said master DCA to said pooler bus;

d. fourth means coupled to said pooler bus and to said slave DCA, said fourth means for gating the information from said pooler bus to said slave DCA;

e. fifth means coupled to said slave DCA and to said slave I/O bus, said fifth means for placing the information from said slave DCA on said slave I/O bus;

f. and sixth means coupled to said slave I/O bus and to said slave record memory, said sixth means for writing the information from said slave I/O bus into said slave record memory.

23. The data processing pooler system as recited in claim 22 wherein said second, third and fourth means comprise AND gates.

24. A data processing pooler system comprising a plurality of key-to-tape devices each having a central control unit (CCU); a plurality of I/O buses coupled one each to one each of said CCU's; a pooler bus coupled to each CCU; device selection means coupled to said CCU's, said device selection means for designating a master key-to-tape-unit, said master key-to-tape unit for transmitting information to the other of said plurality of key-to-tape devices, said device selection means including device enabling means for enabling a select-read-function.

25. The data processing pooler system as recited in claim 24 including set-up-pooler means for enabling a set-up-pooler function.

* * * * *

UNITED STATES PATENT OFFICE

CERTIFICATE OF CORRECTION

Patent No. 3,715,727 Dated February 6, 1973

Inventor(s) Frank K. Yu

It is certified that error appears in the above-identified patent and that said Letters Patent are hereby corrected as shown below:

Column 19, line 2, delete "1" and substitute therefor --4--.

Signed and sealed this 18th day of December 1973.

(SEAL)
Attest:

EDWARD M.FLETCHER,JR.
Attesting Officer

RENE D. TEGTMEYER
Acting Commissioner of Patent